US008476554B2

(12) United States Patent
Samodell

(10) Patent No.: US 8,476,554 B2
(45) Date of Patent: Jul. 2, 2013

(54) METHODS AND APPARATUS FOR IMPROVED LOW CURRENT AC/DC TIG WELDING AND STARTING

(75) Inventor: Ralph Samodell, Willoughby Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2565 days.

(21) Appl. No.: 11/142,593

(22) Filed: Jun. 1, 2005

(65) Prior Publication Data

US 2006/0273075 A1 Dec. 7, 2006

(51) Int. Cl.
*B23K 9/10* (2006.01)
*B23K 9/12* (2006.01)

(52) U.S. Cl.
USPC ............ 219/130.51; 219/130.1; 219/137 PS; 219/130.32; 219/130.4

(58) Field of Classification Search
USPC ................ 219/130.1, 130.4, 130.51; 307/43, 307/52, 50, 85, 86, 87
See application file for complete search history.

(56) References Cited

U.S. PATENT DOCUMENTS

| 3,588,465 | A | * | 6/1971 | Anderson et al. ......... 219/137 R |
| 3,774,007 | A | | 11/1973 | Chiasson et al. |
| 4,180,720 | A | * | 12/1979 | Barhorst ................. 219/130.51 |
| 4,758,707 | A | * | 7/1988 | Ogilvie et al. ........... 219/130.51 |
| 4,950,864 | A | * | 8/1990 | Campiotti et al. ......... 219/130.4 |
| 5,148,001 | A | | 9/1992 | Stava |
| 5,218,182 | A | | 6/1993 | Vogel et al. |
| 5,645,741 | A | | 7/1997 | Terayama et al. |
| 6,034,350 | A | * | 3/2000 | Heraly et al. ............. 219/130.4 |
| 6,075,224 | A | | 6/2000 | De Coster |
| 6,177,651 | B1 | * | 1/2001 | Reynolds et al. ....... 219/137 PS |
| 6,384,373 | B1 | * | 5/2002 | Schwartz et al. .......... 219/130.1 |
| 6,388,232 | B1 | | 5/2002 | Samodell et al. |

FOREIGN PATENT DOCUMENTS

JP 55005182 A * 1/1980
JP 56068585 A * 6/1981

* cited by examiner

*Primary Examiner* — Tu B Hoang
*Assistant Examiner* — Brian Jennison
(74) *Attorney, Agent, or Firm* — Hahn Loeser & Parks LLP

(57) ABSTRACT

A TIG welder and methodologies for providing an output welding current in a welding circuit. The welder has main and background power supplies. The main supply has an SCR network which selectively connects a transformer secondary winding to the welding circuit according to SCR control signals. The background supply is connected to the SCR network, which selectively connects the second power supply to the welding circuit according to the SCR control signals. The SCR network may have first and second SCRs operating according to first and second SCR control signals from a control circuit, where the control circuit is connected to the SCR network and the second power supply and selectively connects the SCR control signals to the SCR network according to the setpoint current value.

39 Claims, 13 Drawing Sheets

METHODS AND APPARATUS FOR IMPROVED LOW CURRENT AC/DC TIG WELDING AND STARTING

FIELD OF THE INVENTION

The present invention relates generally to welding equipment and more particularly to apparatus and methods for AC and DC TIG welding and starting at low current levels.

INCORPORATION BY REFERENCE

Tungsten inert gas (TIG) welding involves the provision of AC or DC welding current to a welding circuit in which a tungsten electrode is spaced from a workpiece to define a gap, in order to create an arc in the gap for melting a filler wire moved into the arc. In TIG welding, problems occur in starting or establishing an arc to begin the welding process, as well as in operating at relatively low currents. With respect to arc starting, De Coster U.S. Pat. No. 6,075,224 illustrates an arc starter circuit using high frequency and is incorporated herein by reference as background information. In regards to DC welding operation at low current levels, auxiliary or background power supplies are sometimes employed in conjunction with a standard phase controlled constant current stage. In such welders, the background supply maintains a minimum current and the main power supply provides weld current above a minimum level. Examples of such welder architectures are illustrated in Campiotti U.S. Pat. No. 4,950,864, Vogel U.S. Pat. No. 5,218,182, Terayama U.S. Pat. No. 5,645,741, and Heraly U.S. Pat. No. 6,034,350, and these patents are incorporated herein by reference. In addition, Samodell U.S. Pat. No. 6,388,232 entitled "STARTING AND WELDING DEVICE FOR DC TIG WELDER AND METHOD OF OPERATING SAME", assigned to the assignee of the present invention, is incorporated by reference as if fully set forth herein.

BACKGROUND OF INVENTION

Electric welders are employed in a variety of field applications, in which electric power is applied to a gap in a welding circuit between a workpiece to be welded and an electrode. One type of welding process is known as tungsten inert gas (TIG) welding, wherein heat is generated from an electric arc maintained between a non-consumable tungsten electrode and a part or workpiece being welded. Additional filler metal may, but need not, be employed, such as a separate filler metal wire, where additional material is desired. In TIG welding operations, a shield of inert gas, typically argon protects the melt puddle, electrode, and the optional filler rod from the ambient atmosphere, in order to prevent rapid oxidation of the weld and surrounding metal. TIG welder power supplies may be AC, DC, or combinations thereof, as determined according to the type of metal to be welded. DC welding is often used to weld stainless steel and mild and low alloy steels, whereas AC is typically used to weld aluminum. In AC welding, surface oxidation is removed in the half power cycle where the electrode is positive, and hence this is referred to as the "cleaning" half-cycle, while the negative half-cycle is referred to as the "penetration" half-cycle. The welding voltages and currents provided during the penetration and cleaning half-cycles are typically not equal, for instance, wherein more energy is applied by the welder during penetration than in cleaning. TIG welders, both DC and AC types, commonly include arc starting systems providing high frequency power to the welding circuit during arc initiation, which may be deactivated once the arc is established.

In DC TIG welding, currents are often provided to the welding circuit using a single phase SCR rectifier, wherein the welding current is adjustable by varying the phase firing angle of one or more SCR devices in an SCR network in an output rectifier. In industrial DC welding applications, currents as high as 200-300 amperes are common. However, in some applications, the same industrial DC welders are required to operate at much lower current levels, for example, such as 5-10 amps or less used in welding thin aluminum workpieces. In such a situation, the SCR is only actuated for a short time near the end of the positive power source half-cycle. As a result, arc stability at such low current levels suffers. An auxiliary or background supply may be employed at such low current levels in order to create a fixed minimum current, in conjunction with the phase controlled rectifier. In this implementation, however, problems have been found in starting or establishing the arc at such low current levels. Samodell U.S. Pat. No. 6,388,232 assigned to the assignee of the present application addresses the above shortcomings with respect to DC welders being started and operated at current levels of 5-10 amps or less.

In AC welding applications, alternating currents of 200-400 amperes are often supplied to the welding circuit via SCR controlled square wave supplies, having separate SCRs for connecting the welding electrode with positive and negative voltages. In such AC welders, the SCRs are gated or activated by gating signals during the positive or negative half-cycles of an AC supply source, where the portion of the supply half-cycle in which the SCR is gated determines the amplitude of the AC currents in the welding circuit. Thus, this type of AC welder may also employ phase firing angle control of SCR gating signals in order to provide adjustable AC welding currents. As with DC welders, AC welding equipment often is needed to operate at low current levels for certain applications, and much higher currents for other applications. Difficulties arise in starting and operating such equipment at the low end of the current range, for example, wherein operating levels below about 15-20 amps are desired.

Conventional AC and AC/DC welders often experience erratic operation at such low currents, wherein arc "popping" and "dancing high frequency" conditions are found. For example, a constant current (CC) square wave TIG (SWT) welder designed to operate at up to 200-400 amps controls the amount of AC current delivered to the welding circuit by varying the time that the control SCRs are in the conducting state using phase angle firing signals applied to the SCR control gates. Operation at low current levels requires the control signal to the SCR to be asserted very late in the power cycle, and for a very short time. As the "on-time" for the SCR is reduced, a point is reached at which the short current pulse cannot be sustained by the output current choke in the welder to maintain continuous current flow at high enough output voltage until the following half-cycle gate firing. In this situation, the low current "pops" out, and the arc stabilizing high frequency system is activated to maintain the TIG arc ionization, thereby causing high frequency arc "dancing".

Heretofore, no AC or AC/DC SCR driven welding equipment has been developed which can support both high and low current levels without the above mentioned difficulties in starting and operating at low current levels. Thus, there remains a need for improved apparatus and methodologies for starting and operating AC and AC/DC welders at low current levels, by which the above and other difficulties may be avoided or mitigated.

SUMMARY OF INVENTION

A summary of one or more aspects of the invention is now provided in order to provide a basic understanding of one or more aspects thereof. This summary is not an extensive overview of the invention, and is intended neither to identify key or critical elements of the invention, nor to delineate the scope of the invention. Rather, the primary purpose of the summary is to present some concepts of the invention in a simplified form prior to the more detailed description that is presented later. The present invention is directed to improvements in AC and AC/DC TIG welders by which low current starting and welding operation can be achieved without arc "popping" and "dancing" conditions associated with prior devices. The invention provides square wave AC welding voltages from a background supply to fill in periods between SCR firings of a main AC supply, which advantageously uses an SCR network of the main supply. The background supply thus prevents or minimizes the intermittent loss of arc experienced in conventional welders, and reduces or avoids situations in which the high frequency starting circuit is activated in low current welding operation. This allows welding operation using the background supply alone at very low currents not heretofore achievable, as well as operation with both the background and main supplies at higher currents. The apparatus provided further allows for a variety of arc starting techniques to be employed in low current startup situations.

One aspect of the invention provides a TIG welder operable to provide an output welding current across a gap in a welding circuit between an electrode and a workpiece according to a setpoint current value. The welder comprises first and second (e.g., main and background) power supplies, wherein the first power supply comprises an SCR network operable to selectively connect a transformer secondary winding to the welding circuit according to SCR control signals so as to provide a first current to the welding circuit. The second power supply is connected to the SCR network, which operates to selectively connect the second power supply to the welding circuit according to the SCR control signals so as to provide a second current to the welding circuit through at least one SCR in the first power supply. The SCR network may comprise first and second SCRs operating according to first and second SCR control signals from a control circuit. The control circuit is connected to the SCR network and the second power supply, which operates to selectively connect the SCR control signals to the SCR network according to the setpoint current value. The welder may be used to provide AC or DC current to the welding circuit according to the selected welding process (e.g., for example, according to the type of metal being welded), wherein the welder may be configured (e.g., such as by appropriate jumpers or switches) to provide the corresponding AC or DC currents to the welding circuit.

The second power supply may comprise first and second background supplies connected to the SCR network, where the first SCR operates to selectively connect the first background power supply to the welding circuit according to the first SCR control signal, and the second SCR operates to selectively connect the second background power supply to the welding circuit according to the second SCR control signal so as to provide the second current to the welding circuit. The connection of the background supplies to the SCR network advantageously allows one or more of the SCRs therein to be maintained or latched in a conducting state by background current. This, in turn, facilitates filling in the periods where the main supply is not supplying current to the welding circuit with background current. The background supplies may each comprise a DC supply such as a rectifier connected to a dedicated transformer secondary in the welder, and a background control switch for selectively connecting the rectifier to the SCR network according to a background control signal from the control circuit.

The control circuit may comprise a logic circuit connected to the first and second background power supplies and the SCR network, as well as a comparator circuit connected to the logic circuit. The logic circuit provides the first and second background control signals according to first and second SCR control signals, respectively, and according to a disable signal, for example, wherein the SCR control signals are phase angle firing signals, and the disable signal is provided by the comparator circuit according to the setpoint current value. The logic circuit also provides first and second SCR gating signals to the first and second SCRs according to the first and second SCR control signals, respectively, and according to the disable signal. The logic circuit, moreover, may selectively refrain from providing the first SCR gating signal and the first background control signal or refrain from providing the second SCR gating signal and the second background control signal, in accordance with the disable signal. In this manner, the logic circuit may provide operation of the welder with only one of the background supplies providing the welding circuit current, with the most recently fired SCR being latched by the background supply current. Thus, the invention provides for extremely low current operation in a DC mode or in an AC mode for very low setpoint current values.

Another aspect of the invention provides a method of providing an output welding current in a welder, comprising providing a first power supply having a first transformer secondary winding and an SCR network, the SCR network being connected to the welding circuit, providing a second a second power supply connected to the SCR network, selectively connecting the first transformer secondary winding to the welding circuit using the SCR network during a first portion of a power cycle to provide a first current to the welding circuit, and selectively connecting the second power supply to the welding circuit during a remaining portion of the power cycle using the SCR network. Selectively connecting the first transformer secondary winding may comprise operating at least one SCR in a conductive state according to the SCR control signal so as to connect the first transformer secondary winding to the welding circuit during the first portion of the power cycle, and selectively connecting the second power supply may comprise latching the SCR using current from the second power supply so as to maintain the SCR in the conductive state during the remaining portion of the power cycle.

Yet another aspect of the invention provides a method for starting a welding arc in an AC/DC TIG welder. The method involves starting the arc using DC current from the TIG welder and providing DC current thereafter until a current setpoint exceeds a reference value, such as about 7 amps or less. The method comprises selectively gating a first SCR for a portion of a first input half-cycle to connect the first transformer secondary winding to the welding circuit. This provides current of a first polarity to the welding circuit during the portion of the first input power half-cycle. The method further comprises connecting the second power supply to the welding circuit through the first SCR to provide current of the first polarity thereto during the portion of the first input power half-cycle and thereafter until a second SCR in the SCR network is gated into a conductive state. In this fashion, current from the second power supply latches the first SCR in the on state to provide current of the first polarity to the welding circuit after the first input half-cycle ends. The method also comprises gating the second SCR after a setpoint current value exceeds a first given value for a portion of a second input power half-cycle, thus connecting the first transformer secondary winding to the welding circuit to provide current of a second polarity thereto during the portion of the second input power half-cycle. Thereafter, the first SCR may again be gated, and the process repeated to provide alternating (AC) welding current, until the setpoint current value no longer exceeds the first given value.

The following description and drawings set forth in detail certain illustrative implementations of the invention. These are indicative of but a few of the various ways in which the principles of the invention may be employed. Other objects, advantages and novel features of the invention will become apparent from the following detailed description of the invention when considered in conjunction with the drawings.

PREFERRED EMBODIMENT

Figure 1:
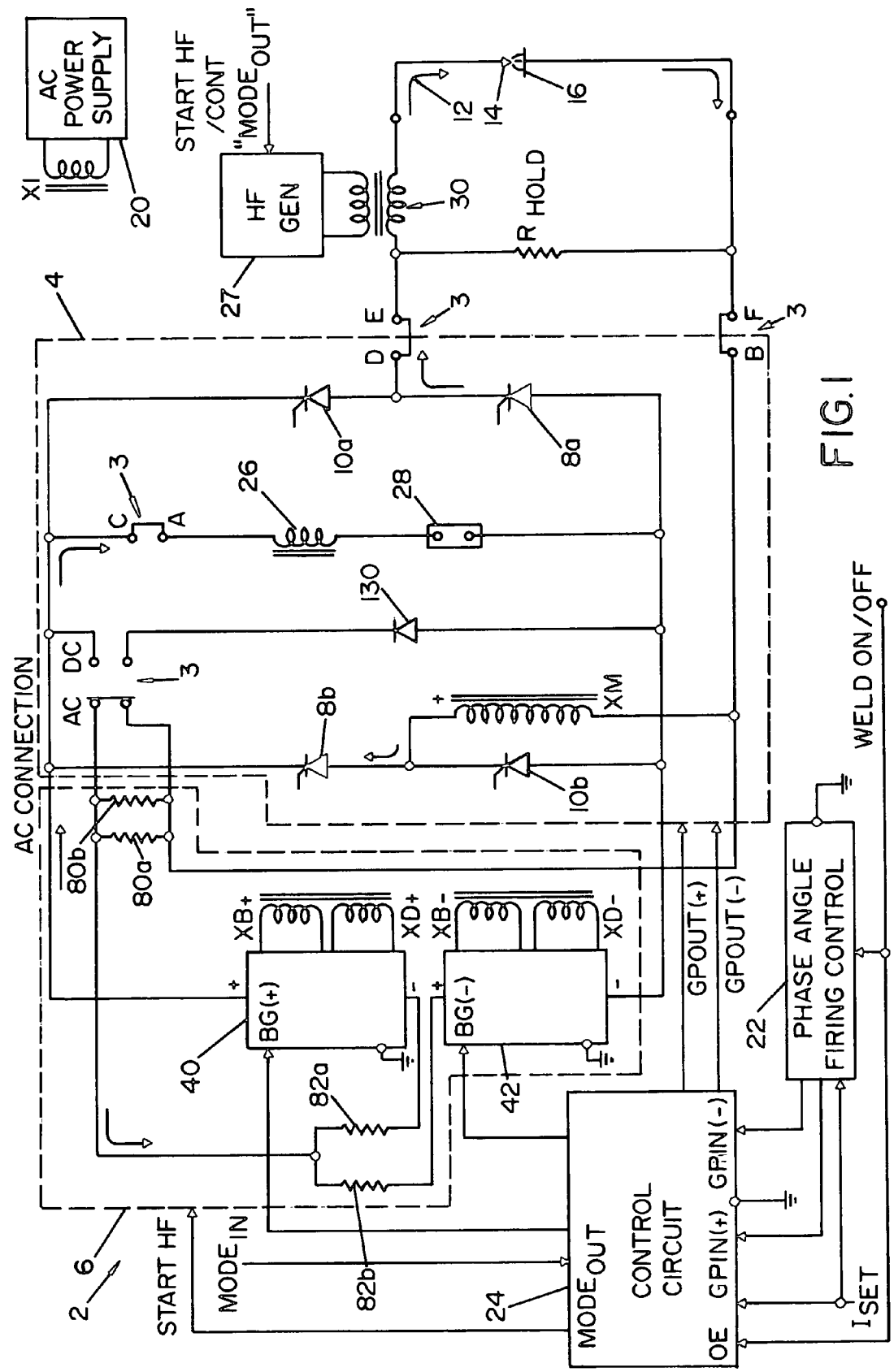
FIG. 1 is a schematic diagram illustrating an exemplary welder connected for AC welding operation in accordance with the present invention.

One or more embodiments or implementations of the present invention will now be described with reference to the drawings, wherein like reference numerals are used to refer to like elements throughout. Apparatus and methodologies are provided for providing AC or DC welding current, by which low current operation and arc starting may be facilitated in welders capable of providing welding currents in excess of 100 amps. The employment of one or more background power supplies operatively connected to a main power supply SCR network allows stable AC or DC welding operation, for example, at AC currents as low as about 5 amps or less, or at DC welding currents of about 2 amps or less, without the erratic low current operation typical in previous welders. In addition, the invention allows employment of a variety of arc starting procedures which further facilitate low current welding operation in welders capable of much higher currents.

Figure 3:
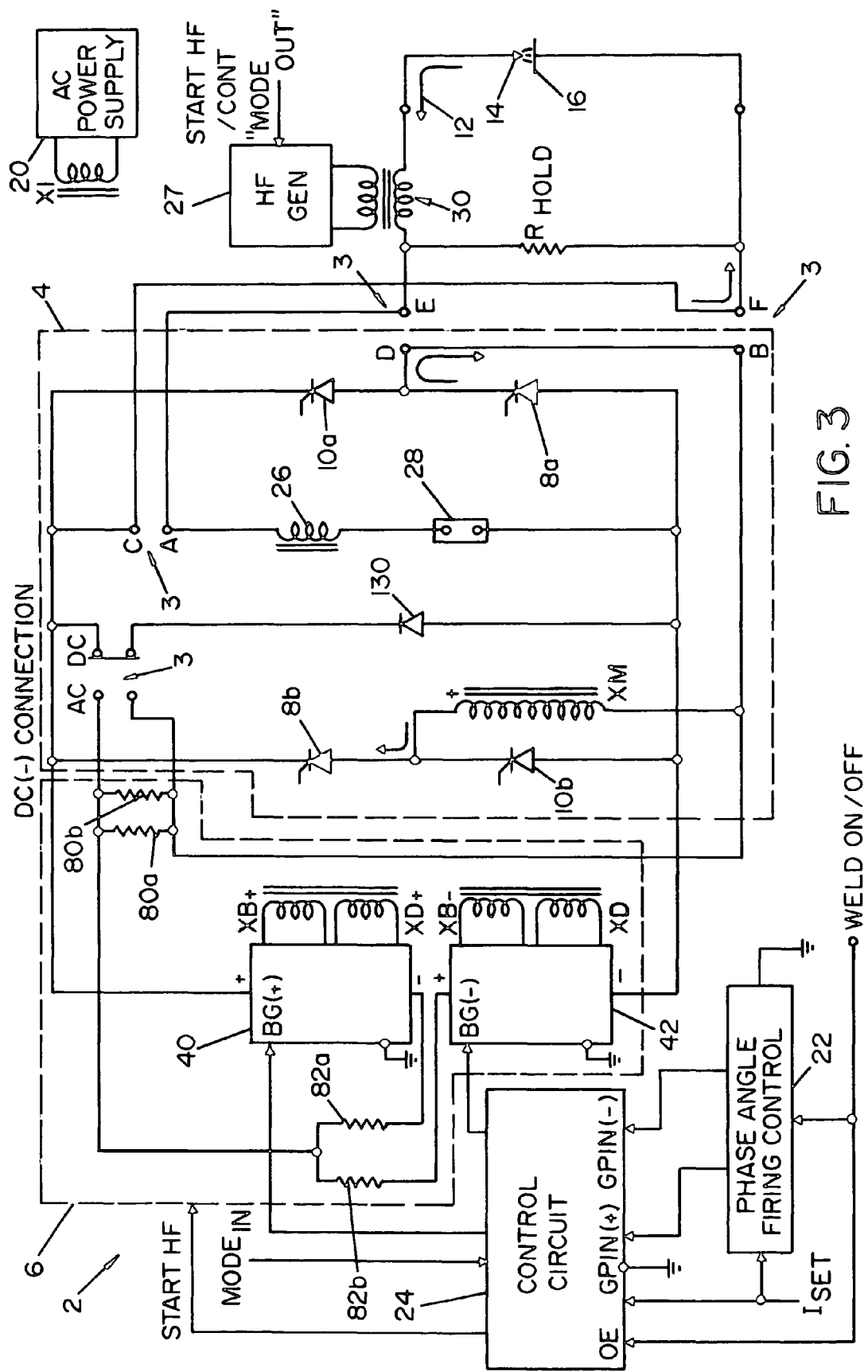
FIG. 3 is a schematic diagram illustrating the exemplary welder of FIG. 1 connected for DC(−) welding operation in accordance with another aspect of the present invention.

FIGS. 1 and 3 illustrate an exemplary AC/DC TIG welder 2 in accordance with the present invention, which may be selectively operable to provide AC or DC weld currents to a welding circuit, through selection of appropriate switch conditions of an AC/DC switch 3, implemented in the welder 2 as a series of jumpers. Although the AC/DC switch 3 is illustrated and described herein as a series of jumpers, other implementations of the switch 3 are contemplated within the scope of the present invention, including relays, solid state switching devices, or others as are known. In addition, while illustrated in the context of this exemplary TIG welder 2, it will be appreciated by those skilled in the welding arts that the various aspects of the invention may be carried out in a variety of TIG welder architectures apart from those illustrated and described herein, and that such implementations are contemplated as failing within the scope of the appended claims.

In FIG. 1, the exemplary welder 2 is illustrated comprising first and second (e.g., main and background) power supplies 4 and 6, respectively, wherein the first power supply 4 comprises an SCR network including a pair of first SCRS 8a and 8b (hereinafter collectively referred to as 8), and a pair of second SCRs 10a and 10b (hereinafter 10 collectively). The welder 2 is operable to provide an output welding current 12 across a gap in a welding circuit between an electrode 14 and a workpiece 16 according to a setpoint current value $I_{SET}$ in a TIG welding operation. The first power supply 4 of the welder 2 also comprises a first transformer secondary winding XM associated with a primary winding X1 for receiving AC power from an AC power supply 20 in the welder 2. The transformer secondary winding XM is connected to the SCR network, by which the selective gating of the SCRs 8 or 10 connects the transformer secondary winding XM across the electrode 14 and the workpiece 16 according to SCR gating signals at the gate terminals thereof, in order to provide a first current to the welding circuit. The SCR gate control signals GPOUT(+) and GPOUT(−) are derived in the welder 2 from a phase angle firing control circuit 22, which provides gate pulse input signals GPIN(+) and GPIN(−) to a control circuit 24, which in turn, provides the SCR gating signals GPOUT(+) and GPOUT(−) to the SCR pairs 8 and 10, respectively. For instance, in a portion of a first half-cycle of the AC input power source (e.g., wherein a positive voltage appears at the positive terminal of the secondary winding XM), the SCR gating signal GPOUT(+) is asserted by the control circuit 24 to place SCRs 8a and 8b in a conductive state. Conversely, in a second input half-cycle, the SCR gating signal GPOUT(−) is asserted by the control circuit 24 to place SCRs 10a and 10b in a conductive state.

Thus, as connected in FIG. 1, the first power supply 4 provides current in the first half-cycle from the positive terminal of the secondary XM along a current path through SCR 8b, a jumper C-A, a welder output choke 26, a shunt 28, SCR 8a, a jumper D-E, and a high frequency arc starting generator 27 with a circuit secondary 30, to the electrode 14, and returning through the workpiece 16 and a jumper B-F. The choke 26 is designed for arc current stabilization during welding wherein the voltage applied by the welder 2 across the output of the SCR network is being switched. The shunt 28 may have a resistance associated therewith, and may be used to sense the current flowing to the welding process, so as to provide feedback as to the actual output welding current of the welder 2, for example, wherein such a feedback signal (e.g., a voltage measured across the terminals of the shunt 28) is supplied to the phase angle firing control circuit 22 for comparison with the setpoint current value $I_{SET}$.

In the second half-cycle, the second SCRs 10 are gated to a conducting state by the second SCR gating signal GPOUT(−), while the first SCRs 8 are turned off by virtue of the current reversal at the secondary XM at the end of the first half-cycle of the power supply 20. In this case, the current leaves the lower terminal of the secondary winding XM, and conducts through jumper B-F, the workpiece 16, electrode 14, high frequency secondary winding 30 of generator 27, jumper D-E, SCR 10a, jumper C-A, choke 26, shunt 28, and through the SCR 10b into the upper terminal of the secondary winding XM. The phase angle firing control circuit 22 thus provides the signals GPIN(+) and GPIN(−) to the control circuit 24 having a controlled firing angle in the respective input power half-cycles prior to the end thereof in a manner well known in the art. In this manner, the signals GPIN(+) and GPIN(−) are asserted by the phase angle circuit 22 a controlled time period (e.g., corresponding to a controlled electrical phase angle) prior to the end of the positive and negative half-cycles, in accordance with the desired setpoint current value. As is known, the SCRs 8, 10 will become conductive upon receipt of the gating signal GPOUT from the control circuit 24 and remain in the conductive state until the end of the half-cycle, whereat the current through the secondary winding XM changes polarity, unless latched in the conductive state through operation of the background or second power supply 6, as described in greater detail hereinafter.

The second power supply 6 is also connected to the SCR network and is actuated by first and second background signals BG(+) and BG(−), respectively, from the control circuit 24, by which the SCR network is operable to selectively connect the second power supply 6 to the welding circuit according to the SCR control signals GPIN(+) and GPIN(−) so as to provide a second current to the welding circuit. Thus, the background supply 6 provides filling or background current to the welding circuit through the first power supply 4. The second power supply 6 comprises first and second background DC power supplies 40 and 42, each having positive and negative output terminals, with background secondary windings XB+ and XB−, and control power secondary windings XD+ and XD−, respectively, which are described in greater detail hereinafter with respect to FIG. 11. The first background power supply 40 is connected to the SCR network, which selectively connects the supply 40 to the welding circuit according to the signal GPOUT(+), and the second background power supply 42 is connected to the SCR network, which selectively connects the supply 42 to the welding circuit according to the signal GPOUT(−), so as to provide the second current to the welding circuit through the SCR network (e.g., SCRs 8 and 10) of the first power supply 4.

Figure 11:
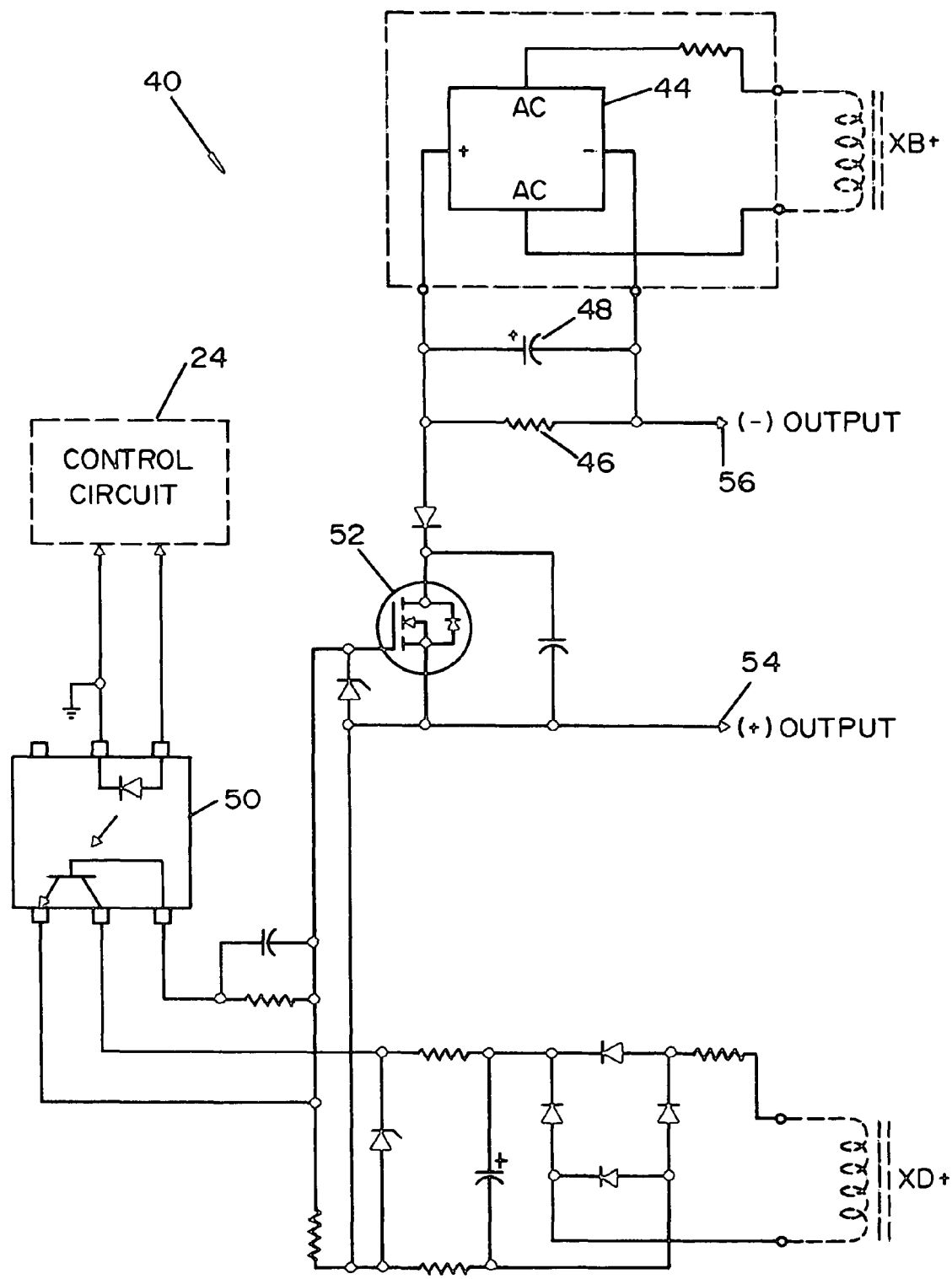
FIG. 11 is a schematic diagram illustrating further details of one of the exemplary background power supplies of the welder of FIGS. 1 and 3.

Referring also to FIG. 11, one implementation of the first background power supply 40 is illustrated in accordance with the present invention. As illustrated, the first background power supply 40 comprises a first background DC power supply comprising a rectifier 44 receiving AC power at about 63 vac from the secondary winding XB+, which is rectified to a DC voltage across a resistor 46 and a capacitor 48 of about 88 vdc. The power supply 40 operates to receive the signal BG(+) from the control circuit 24, which turns on the output transistor of an optical coupler device 50. The supply 40 further comprises another secondary winding XD+ receiving AC power at about 18 vac from the AC power supply 20, which is rectified to about 24 vdc to provide power for the optical coupler 50 and a first background switch 52, which is a field effect transistor (FET) device in the exemplary background power supply 40. The switch 52 operates in response to the BG(+) signal from the control circuit 24 (e.g., via the optical coupler 50) to provide the DC voltage across the resistor and capacitor 46, 48 to the SCR network through positive and negative output terminals 54 and 56, respectively when the switch 52 conducts. In the exemplary welder 2 of FIGS. 1 and 3, the first and second background power supplies 40 and 42 are constructed in similar fashion to one another as illustrated in FIG. 11. However, it will be appreciated that other background supplies may be constructed in accordance with the present invention, apart from the exemplary supply 40 of FIGS. 1, 3, and 11.

Figure 5:
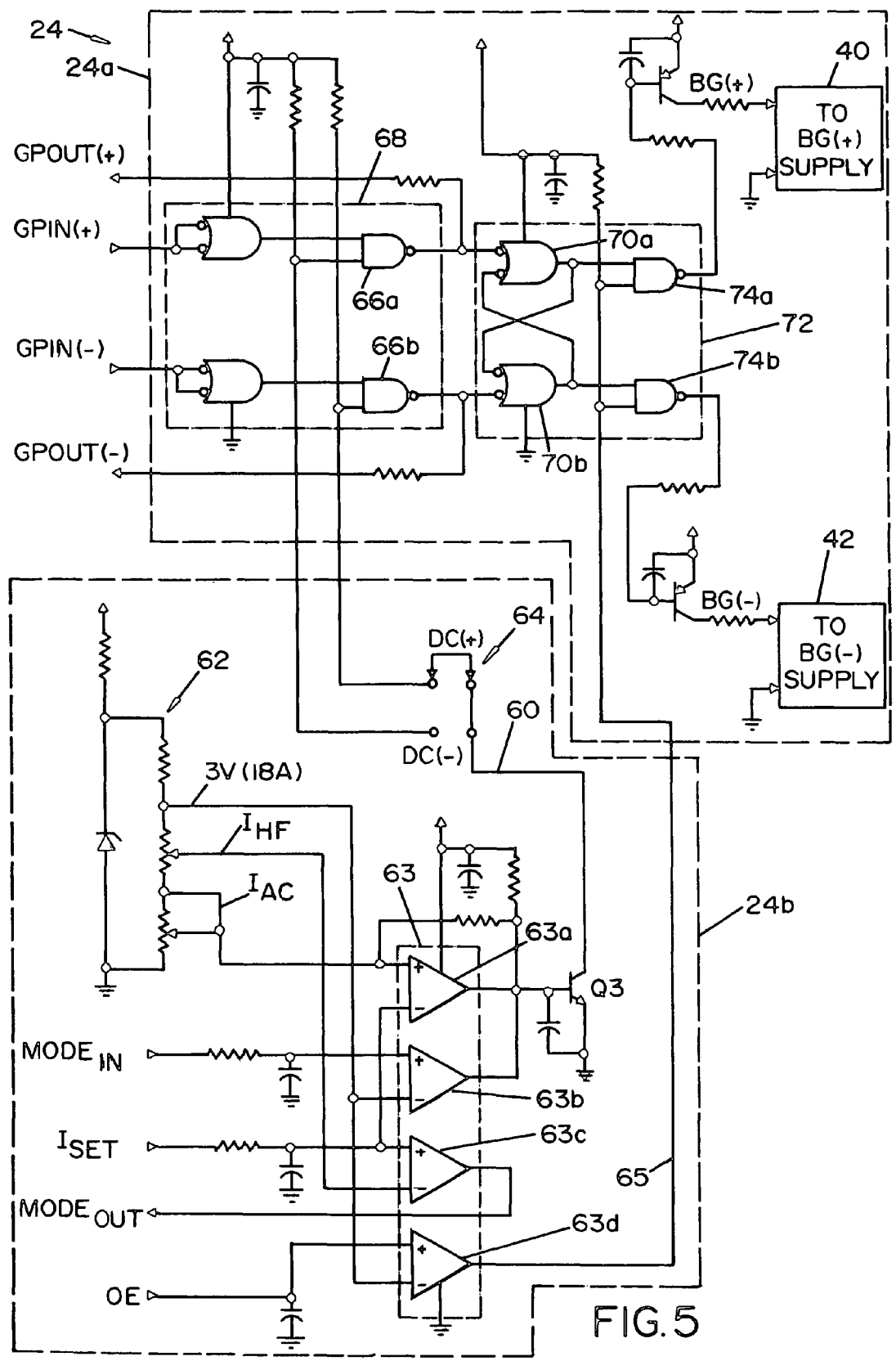
FIG. 5 is a schematic diagram illustrating further details of the control circuit of the exemplary welder of FIGS. 1 and 3.
Figure 6:
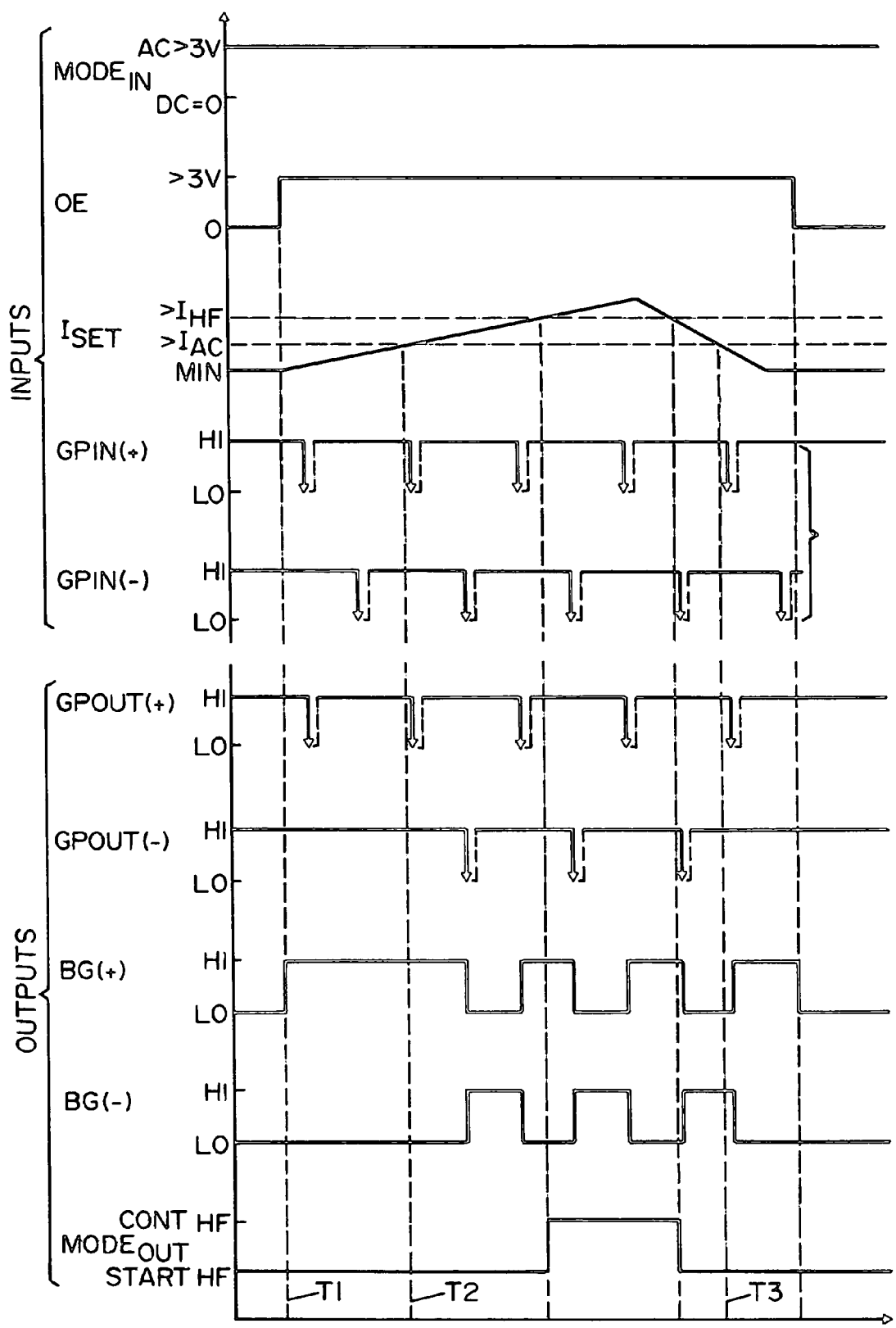
FIG. 6 is a timing diagram illustrating various I/O signals provided by the control circuit of the exemplary welder of FIGS. 1 and 3.

Referring also to FIGS. 5 and 6, further details of the exemplary control circuit 24 are illustrated and described hereinafter in the context of AC mode operation. In operation in accordance with the present invention, the control circuit controls the actuation of the SCRS 8 and 10 by generating SCR gating signals GPOUT(+) and GPOUT(−) according to phase angle firing control signals GPIN (+) and GPIN(−) and a disable signal 60, where the disable signal is generated in the control circuit 24 according to the mode of the welder as represented by a $MODE_{IN}$ signal, the setpoint current value $I_{SET}$, and an output enable signal OE. The first SCR gating signal GPOUT(+) is connected to the gate terminals of the first SCRs 8a and 8b in the power supply 4, and the second SCR gating signal GPOUT(−) is connected to the gate terminals of the second SCRs 10a and 10b. In addition to the SCR gating output signals, the control circuit 24 selectively provides the first and second background control signals BG(+) and BG(−) to the first and second background power supplies 40 and 42, respectively, so as to provide background current to the welding circuit in a controlled fashion according to the phase angle firing control signals GPIN (+) and GPIN(−) and the disable signal 60.

As shown in FIG. 6, the current setpoint value $I_{SET}$ is increased from a minimum value and the output enable signal OE is asserted at time T1, which enables the first background control signal BG(+), and the SCR gating signal GPOUT(+) is asserted concurrently with the first SCR control signal GPIN(+), while the second SCR gating signal GPOUT(−) is disabled until the current setpoint value $I_{SET}$ becomes greater than a first reference value $I_{AC}$ at time T2. At that point, the disable signal 60 is released by transistor switch Q3 in FIG. 5 (e.g., goes high), whereby the next SCR control signal GPIN(−) causes a corresponding second SCR gating signal GPOUT(−) during a second power half-cycle. Also, following the enabling of the second SCR gating signal at T2, the second background control signal BG(−) is enabled, allowing the second background supply 42 to operate following the GPOUT(−) pulses, which disables background control signal BG(+). This operation continues with alternating assertion of the signals GPOUT(+) and GPOUT(−) (e.g., and the corresponding assertion of background control signals BG(+) and BG(−)) until the setpoint current value $I_{SET}$ is brought below $I_{AC}$ at time T3.

As illustrated in FIG. 5, the control circuit 24 comprises a logic circuit 24a and a comparator circuit 24b, wherein the logic circuit 24a is operatively connected to control the switching of the first and second background power supplies 40 and 42 and the SCR network, while the comparator circuit 24b provides the disable signal 60 according to the setpoint current value $I_{SET}$. In particular, the comparator circuit 24b asserts the disable signal 60 as a low voltage by actuating the transistor Q3 when the welder mode is AC (e.g., where the signal $MODE_{IN}$ has a value of about 3 vdc in AC mode and about 0 volts in DC mode), and the setpoint current value $I_{SET}$ is less than a first reference value $I_{AC}$. In the illustrated implementation, $I_{AC}$ is set to about 0.15 vdc via a resistor divider network 62, corresponding to 9 amps output welding current in the welder 2, although any appropriate value may be selected for the reference current value $I_{AC}$. The comparator circuit 24b includes a quad comparator device 63 comprising a first comparator 63a, which asserts the transistor switch Q3 when the setpoint current value $I_{SET}$ is less than $I_{AC}$, as well as a second comparator 63b asserting Q3 when the mode input signal $MODE_{IN}$ indicates AC mode operation for the welder 2. A third comparator 63c provides a $MODE_{OUT}$ output signal, which is high when $I_{SET}$ is greater than a second reference value $I_{HF}$ which can be used if desired to actuate continuous high frequency for AC mode at a higher $I_{SET}$ level, and low otherwise for start only high frequency, and a fourth comparator 63d provides an output enable signal 65 operable when high, to allow assertion of the first and second background control signals BG(+) and BG(−) by the logic circuit 24a via gates 70a and 70b, respectively, in accordance with an output enable input signal OE. The comparator circuit 24b also includes a jumper 64 for selecting DC(−) or DC(+) operation when $I_{SET}$ is below $I_{AC}$. For instance, when the jumper 64 is set to DC(−) operation, the disable signal 60 operates (e.g., when asserted by the transistor switch Q3) to selectively disable the first SCR gating signal GPOUT(+) and the first background control signal BG(+). Alternative, where the jumper 64 is set to DC(+) operation, the disable signal 60 operates to selectively disable the second SCR gating signal GPOUT(−) and the second background control signal BG(−).

The logic circuit 24a receives the disable signal 60 through the selected terminals of jumper 64, and if signal 60 is asserted (e.g., low), the control circuit 24 disables the appropriate pair of signals by operation of first and second NAND gates 66a and 66b in a first logic circuit 68, which in turn, generate the first and second SCR gating signals GPOUT(+) and GPOUT(−). Thus, when disabled by signal 60, the NAND gates 66 provide a high output such that no SCR gating occurs. The gating signals GPOUT(+) and GPOUT(−) also drive set and reset inputs to an RS flip-flop comprising first and second gates 70a and 70b in a second logic circuit 72, where first and second output gates 74a and 74b provide the background control signals BG(+) and BG(−) according to the most recently asserted SCR gating signal (e.g., either GPOUT(+) or GPOUT(−)). In accordance with an aspect of the invention, the logic circuit 24a thus provides for connecting one of the background supplies 40 or 42 to the welding circuit based on the corresponding SCR phase angle firing control signal GPIN(+) or GPIN(−), and thereafter until the other such signal is asserted, or disabled by signal 65.

It is noted in this regard, that where the disable signal 60 causes one of the SCR gating signals GPOUT(+) or GPOUT (−) to be disabled (e.g., by setting the setpoint current value $I_{SET}$ to less than about 9 amps in AC mode), one of the background supplies 40 or 42 will continue to provide current to the welding circuit by latching the most recently gated SCR 8a or 10a, thereby providing a conductive path for background current to continue to flow. Otherwise, in AC mode, the control circuit 24 operates to gate the SCRs 8 or 10 to provide current from the main supply secondary winding XM and the selected background supply 40 or 42 for a portion of each half-cycle, and thereafter to continue to supply background current until the next SCR gating pulse signal GPOUT. Thus, as illustrated in the AC mode configuration of FIG. 1, in the positive half-cycle, the SCRs 8a and 8b are turned on by a pulse GPOUT(+) from the control circuit 24 and the phase angle control circuit 22, by which current from the upper terminal of the main secondary winding XM flows through SCRs 8b and 8a. At the same time, the pulse GPOUT (+) latches the flip-flop in the second logic circuit 72 (FIG. 5) to provide the first background control signal BG(+) which causes background current to flow from the positive terminal thereof, through jumper C-A, choke 26, shunt 28, SCR 8a, jumper D-E, high frequency winding 30 of generator 27, and to the electrode 14 and workpiece 16, returning through jumper B-F and the jumpered parallel combination of two DC mode background resistors 80a and 80b and one of two AC mode resistors 82a and 82b.

Once the SCR gating pulse signal GPOUT(+) ends (e.g., causing the first SCR 8b to turn off after the polarity change of the main secondary winding XM), the current from the first background supply 40 continues to conduct through the above path, thereby latching the other first SCR 8a in the conductive state. This is because the flip-flop 70a and 70b in the control circuit 24 maintains the BG(+) control signal after the phase angle firing signal GPIN(+) and the corresponding gating signal GPOUT(+) are no longer asserted. Thus, the background current from supply 40 (e.g., set to about 5 amps in AC mode by operation of the resistor 82a) conducts for an entire half-cycle. As can be seen from FIGS. 1, 5, and 11, a similar situation occurs for the negative half-cycle, wherein the SCRs 10a and 10b are initially gated on by the signal GPOUT(−), and thereafter, the control circuit 24 maintains the second background supply 42 to latch the SCR 10a in the conductive state, by which background current is supplied through resistor 82b in the absence of current from the first power supply 4.

Figure 2A:
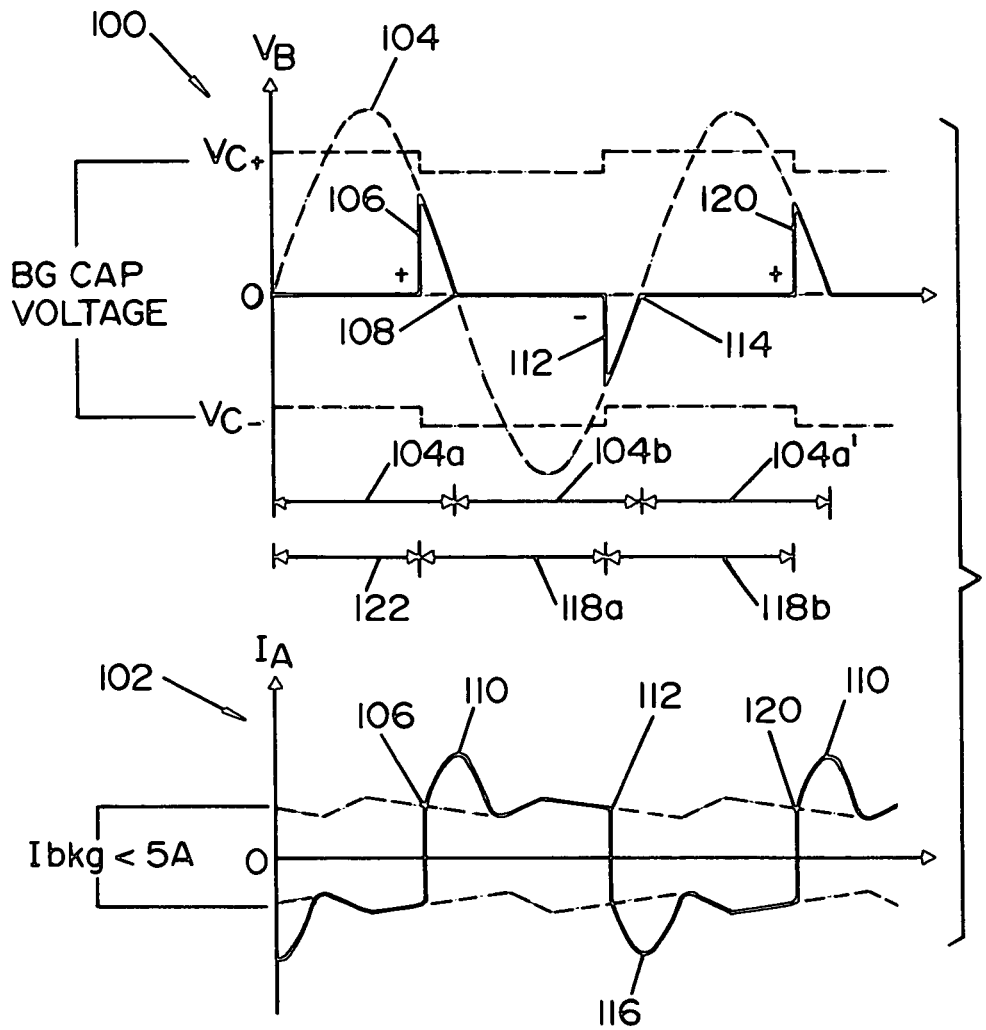
FIG. 2A provides voltage and current curves illustrating operation of the welder of FIG. 1 for low AC setpoint current values at about 5 amps.
Figure 2B:
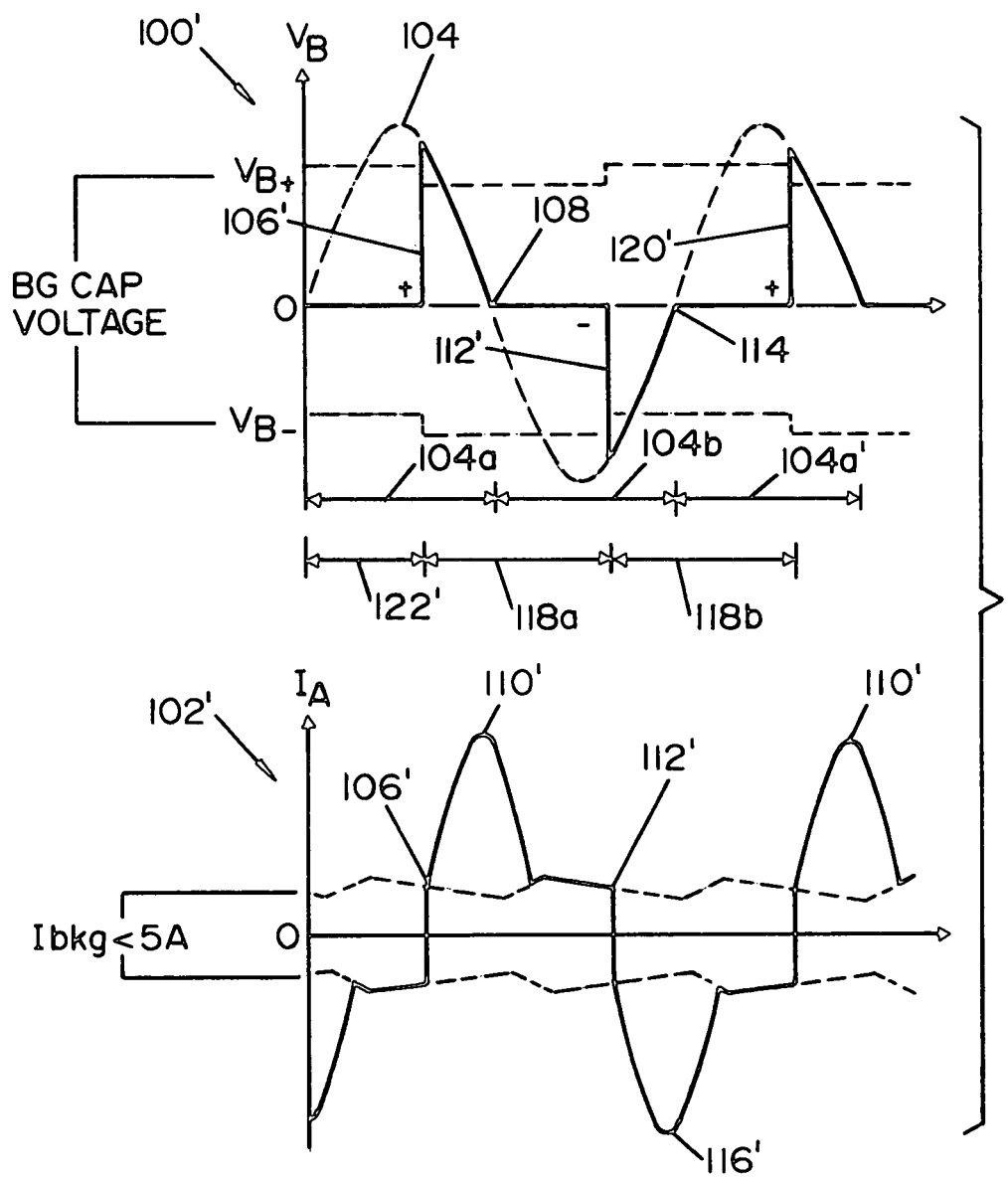
FIG. 2B provides voltage and current curves illustrating operation of the welder of FIG. 1 for low AC setpoint current values above about 5 amps.
Figure 2C:
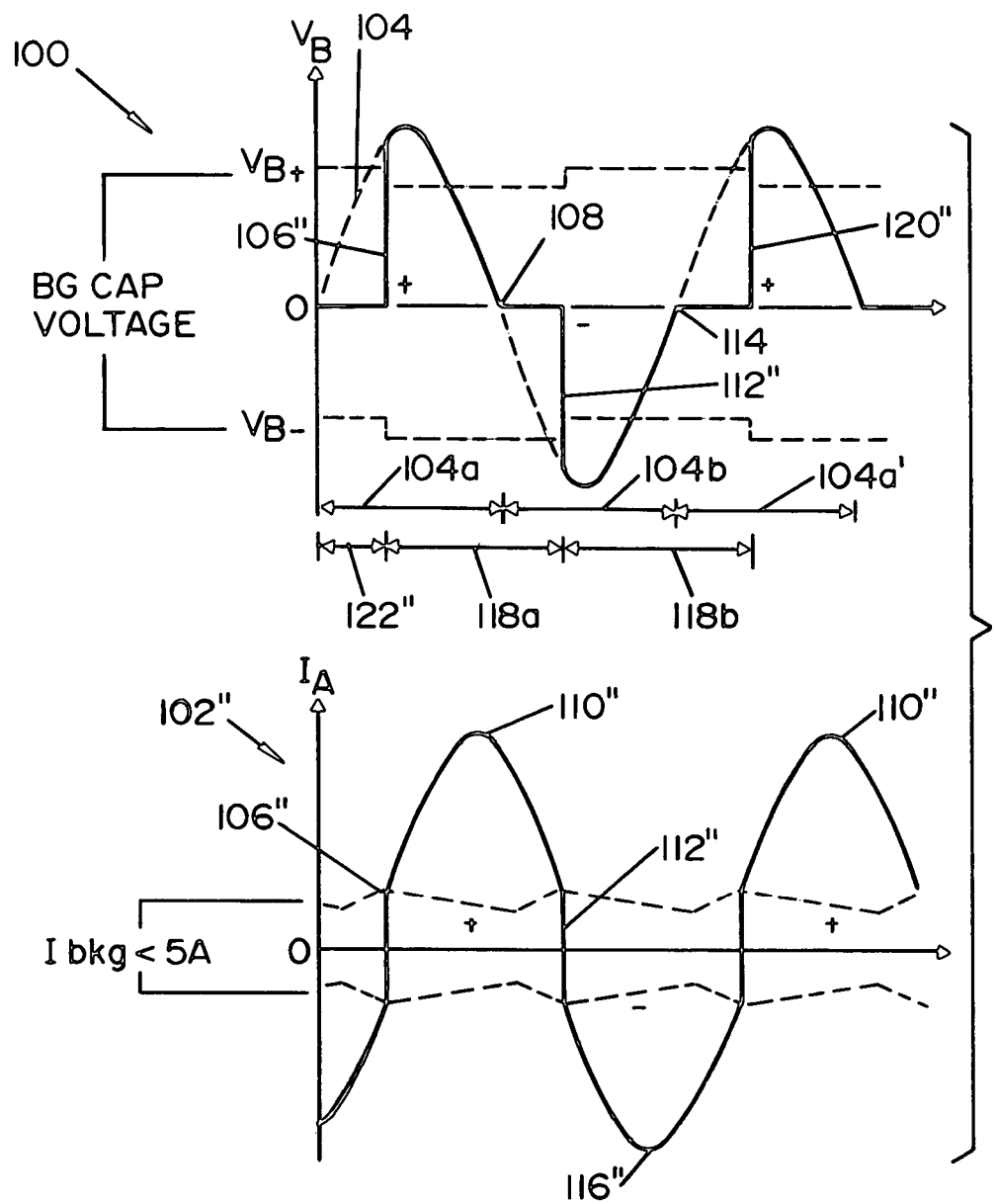
FIG. 2C provides voltage and current curves illustrating operation of the welder of FIG. 1 for high AC setpoint current values.

Referring also to FIGS. 2A-2C, voltage and current curves are illustrated for the welder 2 in AC mode at various operating currents. In FIG. 2A, the curves 100 and 102 illustrate a case where the current setpoint value $I_{SET}$ is adjusted to about 5 amps, and the second or background power supply 6 is set to provide about 5 amps or less of AC current to the welding circuit (e.g., by appropriate selection of the resistors 82 in the second supply 6. The voltage 104 at the main secondary winding XM is illustrated in the upper curve 100 for three exemplary half-cycles thereof, including a first input half-cycle 104a, a second input half-cycle 104b, and a subsequent first input half-cycle 104a'. In accordance with the setpoint value $I_{SET}$, the first SCRs 8 are gated at time 106 by the SCR gating signal GPOUT(+) from the control circuit 24 from the time 106 until time 108, causing a small current pulse 110 in the output current provided to the welding circuit. Also at time 106, the control circuit 24 provides the first background control signal BG(+) to enable the first background power supply 40 to supply background current of about 5 amps or less to the welding circuit thereafter until time 112. Thus, the background current flows after the main supply current has been discontinued, so as to fill in the time periods between SCR gating pulse signals GPOUT(+) and GPOUT(−). At time 112, the second SCR gating signal GPOUT(−) is asserted until time 114, causing a negative current pulse 116 in the output current. Also at 112, the control circuit 24 asserts the second background control signal BG(−) to provide background current from the second background supply 42 thereafter until the next assertion of GPOUT(+).

It is noted in FIG. 2A, that positive current is supplied to the welding circuit from time 106 until time 112, thus establishing a first output half-cycle 118a, and that negative current is supplied from time 112 until a subsequent gating signal GPOUT(+) is provided at time 120, thus establishing a second output half-cycle 118b, wherein the output half-cycles 118a and 118b lag the input half-cycles 104a and 104b, respectively by a phase angle 122 generally equal to 180 degrees minus the portion of each input cycle in which the SCR gating signal GPOUT is asserted. In addition, the periods between times 106 and 108, and between times 112 and 114 (e.g., the time periods during which the SCRs are energized by the control circuit 24 according to the SCR control signals GPIN provided by the phase angle firing control circuit 22 until the end of the half cycle conduction), may, but need not be of equal duration. For instance, the positive SCR period between times 106 and 108 may be shorter than that between times 112 and 114 in AC welding, where a higher (e.g., negative) current is desired for the penetration output half-cycle than for the (positive) cleaning output half-cycle.

In FIG. 2B, another exemplary case is illustrated in curves 100' and 102', in which the current setpoint value $I_{SET}$ is adjusted to between about 5 and 7 amps. The first SCRs 8 are gated at time 106' (e.g., slightly earlier than time 106 in the previous case of FIG. 2A) by the SCR gating signal GPOUT(+) from the control circuit 24 from the time 106' until time 108, causing a somewhat larger current pulse 110' in the output current. Also at time 106', the control circuit 24 provides the first background control signal BG(+) to enable the first background power supply 40 to supply background current at about 5 amps or less to the welding circuit thereafter until time 112' (e.g., earlier than time 112 of FIG. 2A). At time 112', the second SCR gating signal GPOUT(−) is asserted until time 114, causing a negative current pulse or pulse 116' in the output current 12. Also at 112', the control circuit 24 asserts the second background control signal BG(−) to provide background current from the second background supply 42 thereafter until the next assertion of GPOUT(+). Positive current is thus supplied to the welding circuit from time 106' until time 112', thus establishing a first output half-cycle 118a, and negative current is supplied from time 112' until a subsequent gating signal GPOUT(+) is provided at time 120', thus establishing a second output half-cycle 118b, wherein the phase lag angle 122' in FIG. 2B between output half-cycles 118a and 118b and the input half-cycles 104a and 104b, respectively, is smaller than phase angle 122 of FIG. 2A, due to the earlier firing angle of the SCR control signals GPIN (and the corresponding SCR gating signals GPOUT), resulting from the somewhat higher current setpoint value $I_{SET}$.

Yet another case is illustrated in curves 100" and 102" of FIG. 2C, wherein the current setpoint value $I_{SET}$ is set well above 7 amps. SCRs 8 are gated at time 106" (e.g., earlier in the first input half-cycle 104a than time 106' in FIG. 2B) by the SCR gating signal GPOUT(+) from the time 106" until the time 108, causing a relatively lengthy current pulse 110" in the output current 12. BG(+) is asserted at 106", causing the background power supply 40 to provide background current to the welding circuit from time 106" until time 112". At time 112", the second SCR gating signal GPOUT(−) is asserted until time 114, causing a negative current pulse 116" in the output current. Also at 112", BG(−) is asserted to provide background current from the second background supply 42 thereafter until the next assertion of GPOUT(+) at 120". In the exemplary case of FIG. 2C, the phase lag angle 122" is relatively small compared with the phase lags 122 and 122' of FIGS. 2A and 2B, respectively, due to the higher current setpoint value $I_{SET}$.

Figure 7:
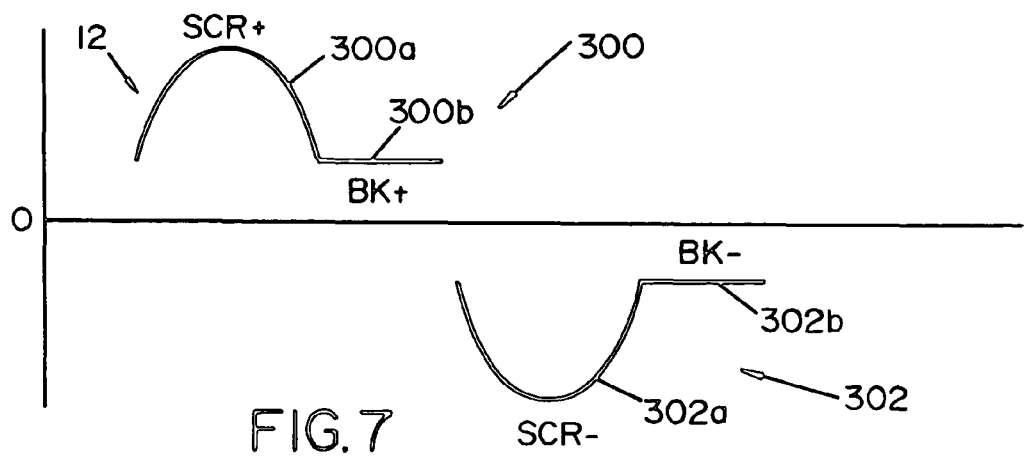
FIG. 7 provides a voltage curve illustrating output voltages from the first and second power supplies of FIG. 1 in AC mode operation.
Figure 8:
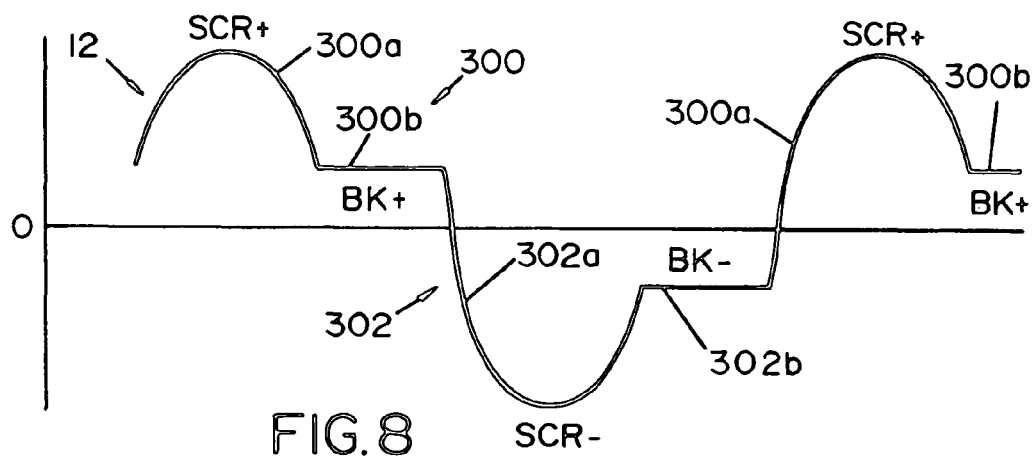
FIG. 8 provides a voltage curve illustrating a composite AC output voltage provided by the first and second power supplies of FIG. 1.

Referring briefly to FIGS. 7 and 8, welder output current curve 300 of FIG. 7 corresponds to the operation of the main supply 4 and the first background supply 40 in the first or positive output half-cycle, wherein the portion 300a includes current from the supply 4 as well as background current from the first background supply 40, and the portion 300b is background current only. A second curve 302 of FIG. 7 illustrates operation of the main supply 4 and the second background supply 42 in the second or negative output half-cycle, wherein the portion 302a includes current from the supply 4 as well as background current from the second background supply 42, and the second portion 302b is background current only. As shown in FIG. 8, the AC mode welding current 12 applied from the welder 2 to the welding circuit in FIG. 1 is the combination of the curves 300 and 302 of FIG. 7.

Thus, as shown in FIGS. 2A-2C, 7, and 8, the welder 2 in AC mode can be successfully operated to provide very low AC welding current to the welding circuit, wherein the problems associated with maintaining an arc at such low currents are avoided or mitigated by filling in the spaces between SCR gating pulses GPOUT with background current from the background supplies 40 and 42, conducted through the SCR network (e.g., SCRs 8a and 10a) of the first power supply 4. In addition, in AC mode, the welder 2 may continue current flow (either positive DC current or negative DC current) below about 7 amps (e.g., such as about 5 amps in the illustrated implementation) when the AC current setpoint $I_{SET}$ is brought below 5 amps. Thus, in FIG. 5, where the jumper 64 is set to the DC(+) position, the control circuit 24 operates in AC mode to disable GPOUT(−) signals and BG(−) signals at such low current settings, and continues positive DC current to the welding circuit via the supply 40 through the latched SCR 8a. Similarly, if the jumper 64 is set to the DC(−) position, the control circuit 24 disables GPOUT(+) signals and BG(+) signals at such low current settings, and continues negative DC current to the welding circuit via the supply 42 through the latched SCR 10a.

As discussed above, the exemplary welder 2 may be operated in DC as well as AC modes, whereby a wide variety of welding operations may be supported, through simple switching of AC/DC mode switch 3. Referring now to FIG. 3, the TIG welder 2 is connected for DC welding operation, via the illustrated jumper settings of the AC/DC mode switch 3 (e.g., jumper settings C-F, D-B), by which a current path is provided during a portion of a positive input power half-cycle from the positive (e.g., upper) terminal of the main power supply transformer secondary XM, through first SCR 8b, jumper C-F, workpiece 16, electrode 14, high frequency winding 30 of generator 27, jumper E-A, choke 26, shunt 28, and first SCR 8a, to the lower terminal of transformer secondary winding XM. In the DC mode connection of FIG. 3, moreover, a flyback mode diode 130 is connected in the SCR network across SCRs 8a and 10. The portion of the first input half-cycle in which the SCRs 8 are gated on is again determined by the length of the first SCR control signal GPIN(+)

from the phase angle firing control circuit 22 (FIG. 1) and the corresponding SCR gating signal GPOUT(+) (e.g., unless disabled by the control circuit 24). During a portion of a negative input half-cycle in which the SCR gating signal GPOUT(-) is asserted, SCRs 8 are not gated, and second SCRs 10 are gated on, whereby the main supply current leaves the lower terminal of secondary winding XM, conducting through the jumper B-D, SCR 10a, jumper C-F, workpiece 16, electrode 14, high frequency winding 30 of generator 27, jumper E-A, choke 26, shunt 28, and second SCR 10b, to the upper terminal of transformer secondary winding XM.

The control circuit 24 operates in the DC mode to also selectively enable one of the background DC supplies 40 and 42 as the corresponding SCR pairs 8 or 10 are gated, wherein the enabled background supply 40 or 42 latches the selected SCR 8a or 10a, after the termination of the corresponding SCR gating signal GPOUT(+) or GPOUT(-), respectively. In the positive input half-cycle (e.g., where the voltage across the top and bottom terminals of the secondary winding XM is positive), the first SCR gating signal GPOUT(+) is asserted to turn on SCRs 8 during a portion thereof, and the first background control signal BG(+) is asserted, whereby background current from the first background supply 40 leaves the plus terminal thereof, and conducts through jumper C-F, workpiece 16, electrode 14, high frequency winding 30, jumper E-A, choke 26, shunt 28, first SCR 8a, the parallel combination of DC mode resistors 80a and 80b, and the resistor 82a to the negative terminal of the first background supply 40. This background current from the supply 40 latches the SCR 8a on after removal of the SCR gating signal GPOUT(+) thereto, such that background current continues to flow therethrough to the welding cycle even after current from the main secondary winding XM is discontinued by SCR operation turning off SCR 8b.

Conversely, in the negative input half-cycle, the second SCR gating signal GPOUT(-) is asserted to turn on SCRs 10, and the first background control signal BG(-) is asserted, whereby background current from the second background supply 42 leaves the plus terminal thereof, and conducts through resistor 82b, parallel resistors 80a and 80b, jumper B-D, SCR 10a, jumper C-F, workpiece 16, electrode 14, high frequency winding 30, jumper E-A, choke 26, shunt 28, and returns to the negative terminal of the supply 42, wherein the background current from supply 42 operates to latch the second SCR 10a in the on or conductive state even after discontinuance of the SCR gating signal GPOUT(-) by the control circuit 24.

It is noted that the values of the DC and AC mode resistors 80 and 82 are set to about 12.5 OHMs and 7.5 OHMs, respectively, in the illustrated implementation, by which the background current supplied by the background supplies 40 and 42 is about 2 amps in DC operation. However, it will be appreciated that other background DC or AC mode current levels may be achieved in accordance with the present invention, for example, by selecting different values for the resistors 80 and/or 82 or other levels of background voltage supplies 40 and 42. Thus, the invention advantageously provides for very low current DC welding operation (e.g., below about 5 amps, such as about 2 amps DC), as well as for very low AC current welding operation (e.g., about 7 amps AC or less) as discussed above.

Figure 4A:
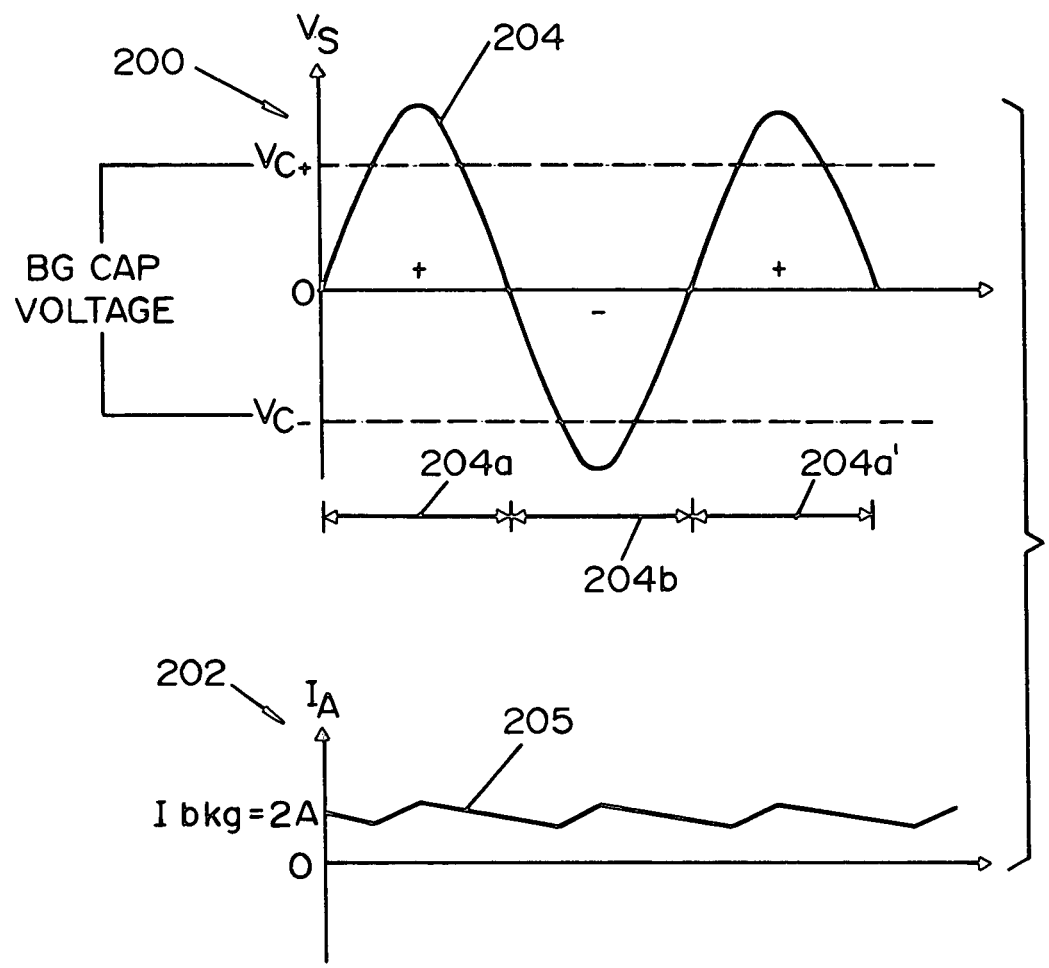
FIG. 4A provides voltage and current curves illustrating operation of the welder of FIG. 3 for low DC setpoint current values at about 2 amps.
Figure 4B:
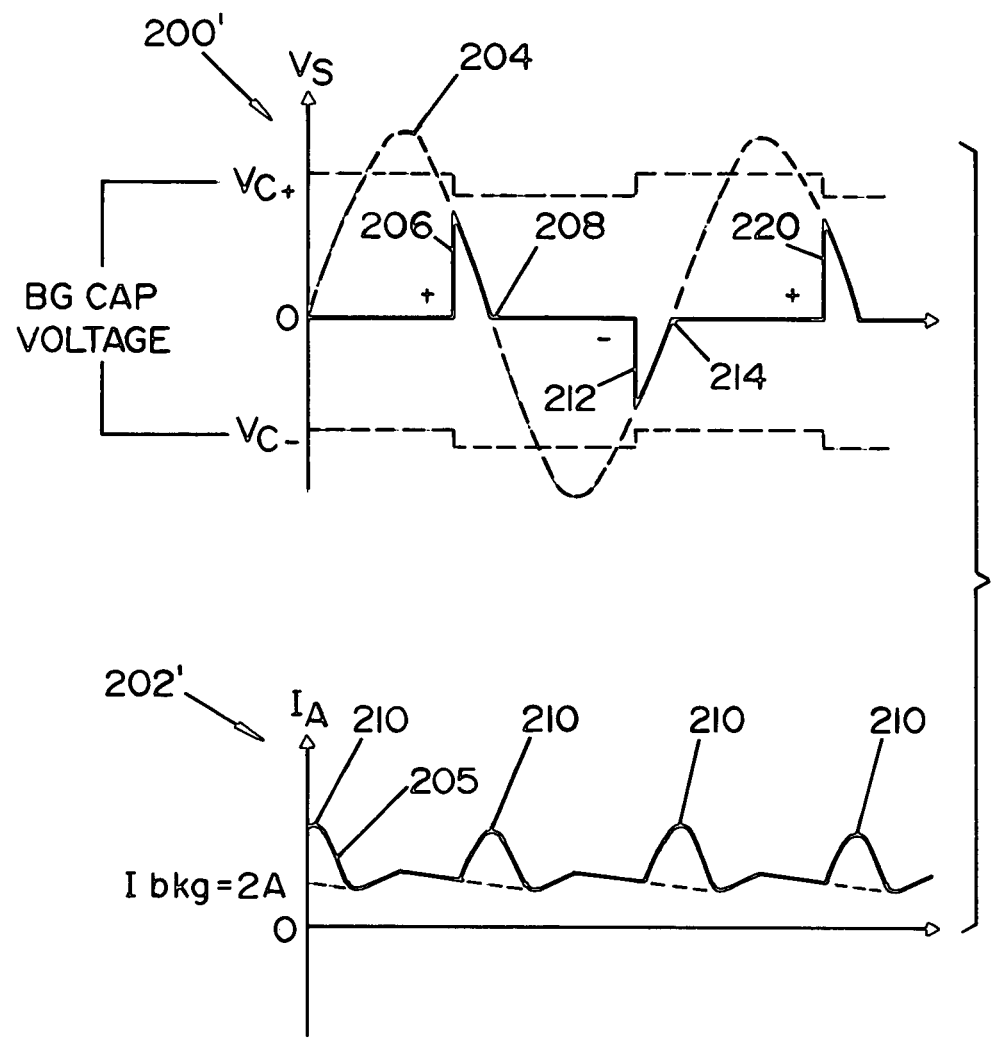
FIG. 4B provides voltage and current curves illustrating operation of the welder of FIG. 3 for low DC setpoint current values above about 2 amps.
Figure 4C:
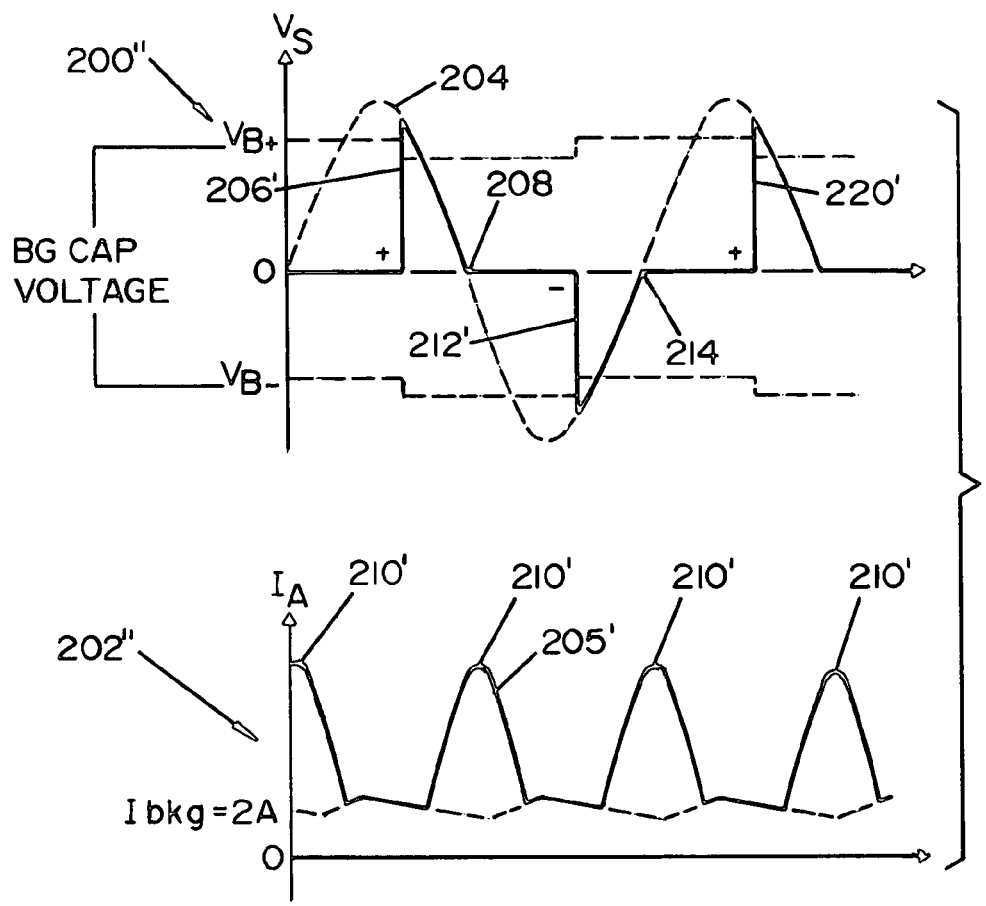
FIG. 4C provides voltage and current curves illustrating operation of the welder of FIG. 3 for high DC setpoint current values.

Referring also to FIGS. 4A-4C, the welder 2 may operate to provide DC current, either positive or negative, to the welding circuit with or without SCR gating signals GPOUT, depending upon the current setpoint value $I_{SET}$, such that very low current operation is facilitated (e.g., about 2 amps DC). As illustrated in FIG. 3, the DC mode jumper settings provide for background current of a single polarity to be delivered to the welding circuit regardless of which of the background supplies 40 or 42 is activated at any given time. Thus, where DC(+) or DC(-) welding is selected by the mode switch 3, welding at extremely low current setting is achieved by either the positive background supply 40 without repeated SCR gating signals GPOUT through the latching of SCR 8a in the on or conductive state by the background current from the supply 40, or the negative background supply 42 without repeated SCR gating signals GPOUT through the latching of SCR 10a by the background current from the supply 42. In other words, the polarity switch 3 selects the DC polarity, but depending on which SCR (8a or 10a) was last conducting the starting pulse, the minimum output current could be supplied by either background supply 40 or 42.

DC welding without SCR gating pulses (e.g., other than an initial starting pulse during arc initiation) is illustrated in FIG. 4A, wherein voltage and current curves 200 and 202 are illustrated for the welder 2 in DC mode for a setpoint value $I_{SET}$ of about 2 amps. In FIG. 4A, one case is illustrated where the current setpoint value $I_{SET}$ is adjusted to about 2 amps, and the background power supply 6 is set to provide about 2 amps or less by the values of the resistors 80 and 82. The voltage 204 at the main secondary winding XM is illustrated in the upper curve 200 for three exemplary half-cycles thereof, including a first input half-cycle 204a, a second input half-cycle 204b, and a subsequent first input half-cycle 204a'. The first SCR 8a, having been previously gated on for a weld start by a gating pulse GPOUT(+), is thereafter maintained or latched in the conductive state by background current 205 provided to the welding circuit by the first background supply 40.

In FIG. 4B, voltage and current curves 200' and 202' are illustrated where the setpoint value $I_{SET}$ has been increased slightly above 2 amps. In this case, the control circuit 24 provides GPOUT(+) pulses at time 206 until time 208, and again at time 220 and an intervening pulse GPOUT(-) at time 212 until time 214. The gating of the first SCRs 8a and 8b via the pulse GPOUT(+) causes a positive current pulse 210 in the welding current 205, which is a composite current comprising main and background supply currents from the supplies 4 and 6, respectively. Also at time 206, the control circuit 24 provides the first background control signal BG(+) to enable the first background power supply 40 to supply background current of about 2 amps thereafter until time 212. Thus, the background current flows after the main supply current has been discontinued, so as to fill in the time periods between SCR gating pulse signals GPOUT(+) and GPOUT(-). At time 212, the second SCR gating signal GPOUT(-) is asserted until time 214, causing another positive current pulse 210 in the output current 205. Also at 212, the control circuit 24 asserts the second background control signal BG(-) to provide background current from the second background supply 42 thereafter until the next assertion of GPOUT(+) at 220. In FIG. 4C, voltage and current curves 200" and 202" illustrate the current setpoint value $I_{SET}$ being increased even further above 2 amps in the illustrated example, wherein the SCR gating signals GPOUT are longer than those of FIG. 4B, resulting in earlier gating times 206', 212', 220', and higher current pulses or peaks 210' in the output current 205'.

Figure 9:
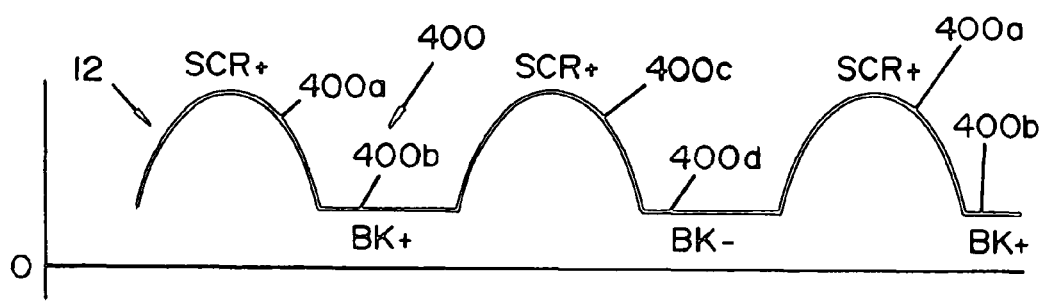
FIG. 9 provides a voltage curve illustrating a composite DC output voltage provided by the first and second power supplies of FIG. 3 for intermediate or high current DC welding operation.
Figure 10:
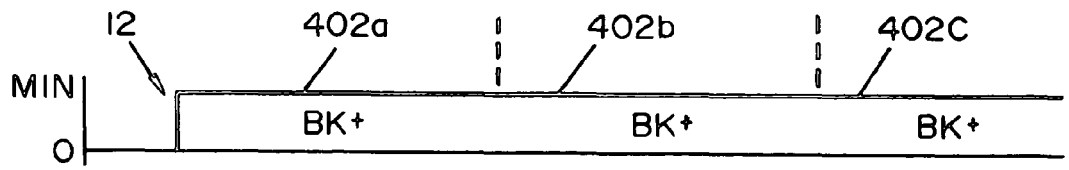
FIG. 10 provides a voltage curve illustrating a composite DC output voltage provided by the second power supply of FIGS. 1 and 3 for lowest current DC(+) welding operation.

Referring also to FIGS. 9 and 10, welder output current curve 400 of FIG. 9 illustrates the operation of the main supply 4 and the second power supply 6 in the DC operating mode, wherein the portion 400a includes welding current 12 from the supply 4 as well as background current from the first background supply 40 and a second portion 400b comprises background current only, supplied by the first background supply 40. Thereafter, a third portion 400c includes current from the main supply 4 and the second background power supply 42 and a fourth portion 400d comprises current solely from the second background supply 42, after which the pattern is repeated as the first background supply 40 is again enabled by the control circuit 24. In FIG. 10, a very low current operation is illustrated for DC welding mode, wherein the setpoint current value $I_{SET}$ has been decreased to about 2 amps, similar to the curves of FIG. 4A described above. Following an initial SCR gating pulse GPOUT(+) (not shown), the first (positive) background supply 40 provides current 12 to the welding circuit, thereby latching the first SCR 8a in the conductive state, and thereafter provides low level current of about 2 amps DC in regions 402a, 402b, and 402c.

Figure 12:
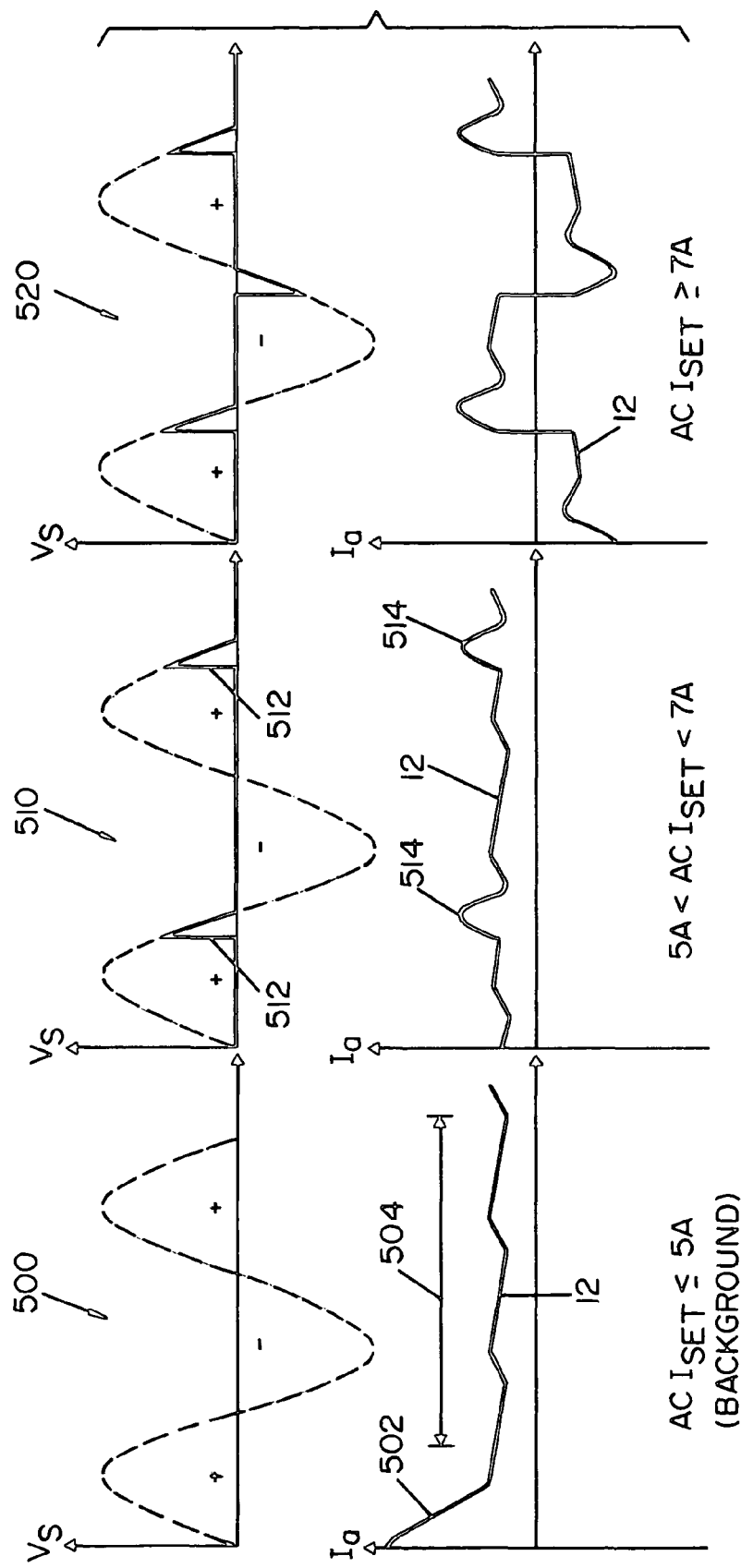
FIG. 12 provides voltage and current curves illustrating an exemplary method of low current DC(+) arc starting and welding with higher current transition to AC welding in accordance with another aspect of the present invention.

Referring now to FIGS. 1 and 12, the welder 2 may be used to implement improved arc starting techniques in accordance with other aspects of the invention. For example, in the DC operating mode, the welder 2 may be started using the techniques illustrated and described in Samodell U.S. Pat. No. 6,388,232. In AC mode, the welder allows a choice of conventional starting techniques, as well as DC starting, with a transition into AC welding operation following arc initiation. FIG. 12 illustrates the welder output voltage VS related to the main supply 4, as well as the welding circuit current 12 in three phases of a novel arc starting methodology 500, 510, and 520, respectively in accordance with the present invention, wherein the control circuit 24 is configured with jumper 64 (FIG. 5) in the DC(+) position.

The control circuit 24 provides only gating signal GPOUT (+) for a start pulse duration in the first phase 500 for a portion 502 of a first input power half-cycle while the high frequency generator 27 of FIG. 1 energizes the high frequency winding 30 in the welding circuit. This connects the transformer secondary winding XM to the welding circuit via the SCRs 8a and 8b to provide relatively high positive polarity current 12 to the welding circuit during the start pulse period 502. The control circuit 24 also energizes the first background supply 40 during the period 502, thus providing background level current 12 to the welding circuit as described above. Alternatively, the second background supply 42 may be employed with the SCRs 10a and 10b, for example, where the jumper 64 of the control circuit 24 is set to the DC(−) position.

Following the starting pulse at 502, the background supply 40 provides low level DC current (e.g., about 5 amps) with the SCR 8a latched thereby, as illustrated at 504 in FIG. 12. This operation continues until the setpoint current value $I_{SET}$ is increased to a point (e.g., between about 5 and 7 amps) where the control circuit 24 again begins gating the first SCRs 8a and 8b at times 512 in the second phase 510, causing corresponding positive current pulses or peaks 514. Further increasing the current setpoint value $I_{SET}$ above about 7 amps in phase 520 operates to turn off switch Q3 of FIG. 5 (e.g., through transition in the output of comparator 63a), whereby the control circuit 24 operates to alternatively assert the SCR gating pulses GPOUT(+) and GPOUT(−), thus alternatively firing the SCRs 8 and 10 (e.g., and also alternatively enabling the first and second background supplies 40 and 42 via background control signals BG(+) and BG(−)), causing the welder 2 to supply alternating polarity AC current to the welding circuit. Once the AC operation has been achieved in phase 520, moreover, high frequency arc stabilization techniques may be employed, for example, using the high frequency generator 27 and the associated winding 30 (FIG. 1). Thus, the invention provides for selection of arc starting methodologies, and also facilitates starting techniques heretofore not achievable in AC welding operations. This may be advantageously employed, for example, in association with AC aluminum welding applications, wherein the inventor has found that the DC starting technique described above provides optimized low current starting and welding stability, with faster heating of the tungsten electrode 14, and improved cleaning during the positive output half-cycle for thin workpieces 16, without the high frequency arc "dancing" and workpiece pitting conditions found in prior welders at low current settings.

Figure 13:
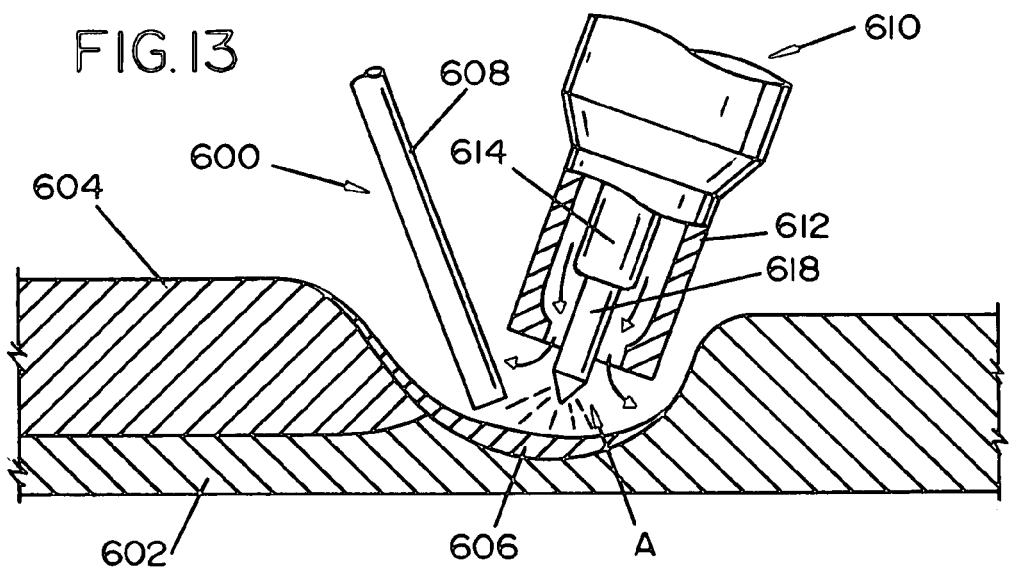
FIG. 13 is a side elevation view in section illustrating a crater fill weld using the exemplary welder of the invention.

The illustrated welding system 2 and the controls and power supplies thereof are further applicable to various applications or situations beyond starting in which stable background current operation are desired. FIG. 13 illustrates one such application in performing a crater weld at the end of a TIG welding cycle or operation in a TIG welding system 600. In this example, the above described AC/DC TIG welder 2 is used to provide welding current to the welding operation in accordance with the present invention, wherein a workpiece 602 is welded to create a weld 604 by controlled deposition of molten metal 606 from a filler wire 608. A TIG torch 610 housing a tungsten electrode 618 is energized by an electrical contact 614 as generally illustrated and described above, and a nozzle 612 surrounds the contact 614 and electrode 618 to provide a gas chamber or passage through which shielding gas is provided to shield a welding arc A and the welding process. As seen in FIG. 13, at the end of the weld, immediate stoppage of the welding arc A may result in formation of an undesirable crater due to abrupt termination of the large arc force commensurate with high current welding operation. Accordingly, the principles of the present invention may be used to slowly drop the welding current level from the high normal level (as shown in phase 520 of FIG. 12) to an intermediate level (e.g., between about 5 and 7 A as shown in phase 510 of FIG. 12), and thereafter to a background current level at or below about 5 A (phase 500 of FIG. 12) to fill in the crater. Thus, the same circuitry described above that switches the low current from DC to AC during starting can be employed to switch back to low level DC as the current set point is reduced for crater-filling at the end of the weld. This advantageously facilitates precise filling of the weld crater with stable low-level DC current without the adverse effects of "dancing" high frequency in the arc commonly experienced in AC crater filling.

In accordance with another aspect of the invention, the background supply levels can be different in the positive and negative polarities, whereby the background current need not be centered around zero. This can be implemented in any suitable manner, for instance, by providing different values of current controlling resistors 82a and 82b in the welder 2 (e.g., FIGS. 1 and 5 above), and/or by providing different amplitude supplies 40 and 42. In this aspect of the invention, the background current imbalance can be set for optimizing cleaning and/or penetration, wherein more negative bias provides higher weld penetration and more positive background bias improves cleaning and better arc stability to inhibit or combat the loss of positive half-wave current or AC TIG "rectification" often found at higher weld currents.

While the invention has been illustrated and described hereinabove with respect to one or more implementations, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A TIG welder operable to provide an output welding current through a gap in a welding circuit between an electrode and a workpiece according to a setpoint current value, said welder comprising:
a first power supply comprising a first transformer secondary winding;
an SCR network connected to said first transformer secondary winding, said SCR network being operable to selectively connect said first transformer secondary winding to said welding circuit according to SCR control signals so as to provide a first current to said welding circuit;
a second power supply connected to said SCR network, said SCR network being operable to selectively connect said second power supply to said welding circuit according to said SCR control signals so as to provide a second current to said welding circuit through at least one SCR in said SCR network of said first power supply;
a control circuit connected to said SCR network and to said second power supply and operable to selectively connect said SCR control signals to said SCR network according to said setpoint current value; and
an AC/DC switch with a first switch condition and a second opposite switch condition;
wherein said welder is operable in an AC mode to provide an AC output welding current through said gap in said welding circuit according to said setpoint current value when said AC/DC switch is in said first switch condition, and is operable in a DC mode to provide a DC output welding current through said gap in said welding circuit according to said setpoint current value when said AC/DC switch is in said second switch condition;
wherein said SCR network is operable in said AC mode to provide current of a first polarity to said welding circuit from at least one of said first and second power supplies in a first half-cycle, and to provide current of a second polarity to said welding circuit from at least one of said first and second power supplies in a second half-cycle according to said setpoint current value; and
wherein said SCR network is operable in said DC mode to provide current of one of said first and second polarities to said welding circuit from at least one of said first and second power supplies according to said setpoint current value.

2. The welder of claim 1:
wherein said SCR network comprises:
a first SCR operating in one of a conductive state and a nonconductive state according to a first SCR control signal from said control circuit, and
a second SCR operating in one of a conductive state and a nonconductive state according to a second SCR control signal from said control circuit; and
wherein said second power supply comprises:
a first background power supply connected to said SCR network, said first SCR being operable to selectively connect said first background power supply to said welding circuit according to said first SCR control signal so as to provide said second current to said welding circuit, and
a second background power supply connected to said SCR network, said second SCR being operable to selectively connect said second background power supply to said welding circuit according to said second SCR control signal so as to provide said second current to said welding circuit.

3. The welder of claim 2:
wherein said first background power supply comprises:
a first background DC power supply, and
a first background switch connected to said first background DC power supply, said first background switch being operable to connect said first background DC power supply to said SCR network according to a first background control signal;
wherein said second background power supply comprises:
a second background DC power supply, and
a second background switch connected to said second background DC power supply, said second background switch being operable to connect said second background DC power supply to said SCR network according to a second background control signal; and
wherein said control circuit comprises:
a logic circuit connected to said first and second background power supplies and said SCR network, said logic circuit being operable to selectively provide said first and second background control signals according to first and second SCR control signals, respectively, and according to a disable signal, and to selectively provide first and second SCR gating signals to said first and second SCRs according to said first and second SCR control signals, respectively, and according to said disable signal, and
a comparator circuit connected to said logic circuit and operable to provide said disable signal according to said setpoint current value.

4. The welder of claim 3, wherein said first SCR control signal is active during a portion of a first half-cycle where a voltage associated with said first transformer secondary is a first polarity and said second SCR control signal is active during a portion of a second half-cycle where a voltage associated with said first transformer secondary is a second polarity.

5. The welder of claim 4:
wherein said logic circuit is operable to selectively assert said first background control signal during said portion of said first half-cycle and thereafter until said second SCR control signal is active, and to assert said second background control signal during said portion of said second half-cycle and thereafter until said first SCR control signal is active: and
wherein said logic circuit is operable to assert said first SCR gating signal to turn on said first SCR during said portion of said first half-cycle and to assert said second SCR gating signal to turn on said second SCR during said portion of said first half-cycle such that said second power supply latches said first SCR in said conductive state after said first half-cycle until said second background control signal is asserted and latches said second SCR in said conductive state after said second half-cycle until said first background control signal is asserted.

6. The welder of claim 3, wherein said logic circuit is operable to selectively refrain from providing said first SCR gating signal and said first background control signal or to selectively refrain from providing said second SCR gating signal and said second background control signal according to said disable signal.

7. The welder of claim 3, wherein said comparator circuit is operable to compare said setpoint current value with a first given current value, and wherein said logic circuit is operable to selectively refrain from providing one of said first and second SCR gating signals if said setpoint current value is less than said first given value, and to selectively refrain from providing one of said first and second background control signals if said setpoint current value is less than said first given value.

8. The welder of claim 5, wherein said logic circuit is operable to selectively refrain from providing said first SCR gating signal and said first background control signal or to selectively refrain from providing said second SCR gating signal and said second background control signal according to said disable signal.

9. The welder of claim 8, wherein said comparator circuit is operable to assert said disable signal in said AC mode if said setpoint current value is less than a first given value.

10. The welder of claim 9, wherein said first given value is about 7 amps.

11. The welder of claim 5, wherein said comparator circuit is operable to compare said setpoint current value with a first given current value, and wherein said logic circuit is operable to selectively refrain from providing one of said first and second SCR gating signals in said AC mode if said setpoint current value is less than said first given value, and to selectively refrain from providing one of said first and second background control signals in said AC mode if said setpoint current value is less than said first given value.

12. The welder of claim 5, wherein said comparator circuit is operable to compare said setpoint current value with a first given current value, and wherein said logic circuit is operable to selectively refrain from providing said first SCR gating signal and said first background control signal if said setpoint current value is less than said first given value in said AC mode.

13. The welder of claim 5, wherein said comparator circuit is operable to compare said setpoint current value with a first given current value, and wherein said logic circuit is operable to selectively refrain from providing said second SCR gating signal and said second background control signal if said setpoint current value is less than said first given value in said AC mode.

14. The welder of claim 11, wherein said logic circuit comprises a flip-flop operable to selectively assert said first background control signal during said portion of said first half-cycle according to said first SCR control signal and thereafter until said second SCR control signal is active, and to assert said second background control signal during said portion of said second half-cycle according to said second SCR control signal and thereafter until said first SCR control signal is active.

15. The welder of claim 14, wherein said flip-flop is an RS flip-flop comprising:
a set input controlled according to said first SCR control signal,
a reset input controlled according to said second SCR control signal,
a first output operable to selectively assert said first background control signal if said flip-flop is set, and
a second output operable to selectively assert said second background control signal if said flip-flop is reset.

16. The welder of claim 1:
wherein said SCR network comprises:
a first SCR operating in one of a conductive state and a nonconductive state according to a first SCR control signal from said control circuit, and
a second SCR operating in one of a conductive state and a nonconductive state according to a second SCR control signal from said control circuit; and
wherein said second power supply comprises:
a first background power supply connected to said SCR network, said first SCR being operable to selectively connect said first background power supply to said welding circuit according to said first SCR control signal so as to provide said second current to said welding circuit, and
a second background power supply connected to said SCR network, said second SCR being operable to selectively connect said second background power supply to said welding circuit according to said second SCR control signal so as to provide said second current to said welding circuit.

17. The welder of claim 16:
wherein said first background power supply comprises:
a first background DC power supply, and
a first background switch connected to said first background DC power supply, said first background switch being operable to connect said first background DC power supply to said SCR network according to a first background control signal;
wherein said second background power supply comprises:
a second background DC power supply, and
a second background switch connected to said second background DC power supply, said second background switch being operable to connect said second background DC power supply to said SCR network according to a second background control signal; and
wherein said control circuit comprises:
a logic circuit connected to said first and second background power supplies and said SCR network, said logic circuit being operable to selectively provide said first and second background control signals according to first and second SCR control signals, respectively, and according to a disable signal, and to selectively provide first and second SCR gating signals to said first and second SCRs according to said first and second SCR control signals, respectively, and according to said disable signal, and
a comparator circuit connected to said logic circuit and operable to provide said disable signal according to said setpoint current value.

18. The welder of claim 17, wherein said logic circuit is operable to selectively refrain from providing said first SCR gating signal and said first background control signal or to selectively refrain from providing said second SCR gating signal and said second background control signal according to said disable signal.

19. The welder of claim 17, wherein said comparator circuit is operable to compare said setpoint current value with a first given current value, and to selectively refrain from providing one of said first and second SCR gating signals if said setpoint current value is less than said first given value, and to selectively refrain from providing one of said first and second background control signals if said setpoint current value is less than said first given value.

20. The welder of claim 17, wherein said first SCR control signal is active during a portion of a first half-cycle where a voltage associated with said first transformer secondary is a first polarity and said second SCR control signal is active during a portion of a second half-cycle where a voltage associated with said first transformer secondary is a second polarity.

21. The welder of claim 20:
wherein said logic circuit is operable to selectively assert said first background control signal during said portion of said first half-cycle and thereafter until said second SCR control signal is active, and to assert said second background control signal during said portion of said second half-cycle and thereafter until said first SCR control signal is active; and
wherein said logic circuit is operable to assert said first SCR gating signal to turn on said first SCR during said portion of said first half-cycle and to assert said second SCR gating signal to turn on said second SCR during said portion of said first half-cycle such that said second power supply latches said first SCR in said conductive state after said first half-cycle until said second background control signal is asserted and latches said second SCR in said conductive state after said second half-cycle until said first background control signal is asserted.

22. The welder of claim 16, wherein said first SCR control signal is active during a portion of a first half-cycle where a voltage associated with said first transformer secondary is a first polarity and said second SCR control signal is active during a portion of a second half-cycle where a voltage associated with said first transformer secondary is a second polarity.

23. The welder of claim 22:
wherein said logic circuit is operable to selectively assert said first background control signal during said portion of said first half-cycle and thereafter until said second SCR control signal is active, and to assert said second background control signal during said portion of said second half-cycle and thereafter until said first SCR control signal is active: and
wherein said logic circuit is operable to assert said first SCR gating signal to turn on said first SCR during said portion of said first half-cycle and to assert said second SCR gating signal to turn on said second SCR during said portion of said first half-cycle such that said second power supply latches said first SCR in said conductive state after said first half-cycle until said second background control signal is asserted and latches said second SCR in said conductive state after said second half-cycle until said first background control signal is asserted.

24. The welder of claim 23, wherein said logic circuit comprises a flip-flop operable to selectively assert said first background control signal during said portion of said first half-cycle according to said first SCR control signal and thereafter until said second SCR control signal is active, and to assert said second background control signal during said portion of said second half-cycle according to said second SCR control signal and thereafter until said first SCR control signal is active.

25. A TIG welder operable to provide an output welding current through a gap in a welding circuit between an electrode and a workpiece according to a setpoint current value, said welder comprising:
first power supply means for supplying welding current comprising an SCR network connected to a first transformer secondary winding, said SCR network being operable to selectively connect said first transformer secondary winding to said welding circuit according to SCR control signals to provide a first current to said welding circuit;
second power supply means for supplying welding current being connected to said SCR network, said SCR network being further operable to selectively connect said second power supply means to said welding circuit through at least one SCR in said SCR network according to said SCR control signals to provide a second current to said welding circuit through said first power supply means; and
control means for controlling said SCR network being connected to said SCR network and said second power supply means and operable to selectively connect said SCR control signals to said SCR network according to said setpoint current value,
wherein said SCR network comprises:
a first SCR operating in one of a conductive state and a nonconductive state according to a first SCR control signal from said control means, and
a second SCR operating in one of a conductive state and a nonconductive state according to a second SCR control signal from said control means; and
wherein said second power supply means comprises:
a first background power supply connected to said SCR network, said first SCR being operable to selectively connect said first background power supply to said welding circuit according to said first SCR control signal so as to provide said second current to said welding circuit, and
a second background power supply connected to said SCR network, said second SCR being operable to selectively connect said second background power supply to said welding circuit according to said second SCR control signal so as to provide said second current to said welding circuit.

26. The welder of claim 25:
wherein said SCR network is operable in an AC mode to provide current of a first polarity to said welding circuit from at least one of said first power supply means and said second power supply means in a first half-cycle, and to provide current of a second polarity to said welding circuit from at least one of said first power supply means and said second power supply means in a second half-cycle according to said setpoint current value: and
wherein said SCR network is operable in a DC mode to provide current of one of said first and second polarities to said welding circuit from at least one of said first power supply means and said second power supply means according to said setpoint current value.

27. The welder of claim 26:
wherein said first background power supply comprises:
a first background DC power supply, and
a first background switch connected to said first background DC power supply, said first background switch being operable to connect said first background DC power supply to said SCR network according to a first background control signal;
wherein said second background power supply comprises:
a second background DC power supply, and
a second background switch connected to said second background DC power supply, said second background switch being operable to connect said second background DC power supply to said SCR network according to a second background control signal; and wherein said control means comprises:
a logic circuit connected to said first and second background power supplies and said SCR network, said logic circuit being operable to selectively provide said first and second background control signals according to first and second SCR control signals, respectively, and according to a disable signal, and to selectively provide first and second SCR gating signals to said first and second SCRs according to said first and second SCR control signals, respectively, and according to said disable signal, and
a comparator circuit connected to said logic circuit and operable to provide said disable signal according to said setpoint current value.

28. The welder of claim 27, wherein said logic circuit is operable to selectively refrain from providing said first SCR gating signal and said first background control signal or to selectively refrain from providing said second SCR gating signal and said second background control signal according to said disable signal.

29. The welder of claim 27:
wherein said comparator circuit is operable to compare said setpoint current value with a first given current value; and
wherein said logic circuit is operable to selectively refrain from providing one of said first and second SCR gating signals if said setpoint current value is less than said first given value, and to selectively refrain from providing one of said first and second background control signals if said setpoint current value is less than said first given value.

30. The welder of claim 27, wherein said first SCR control signal is active during a portion of a first half-cycle where a voltage associated with said first transformer secondary is a first polarity and said second SCR control signal is active during a portion of a second half-cycle where a voltage associated with said first transformer secondary is a second polarity.

31. The welder of claim 30:
wherein said logic circuit is operable to selectively assert said first background control signal during said portion of said first half-cycle and thereafter until said second SCR control signal is active, and to assert said second background control signal during said portion of said second half-cycle and thereafter until said first SCR control signal is active; and
wherein said logic circuit is operable to assert said first SCR gating signal to turn on said first SCR during said portion of said first half-cycle and to assert said second SCR gating signal to turn on said second SCR during said portion of said first half-cycle such that said second power supply latches said first SCR in said conductive state after said first half-cycle until said second background control signal is asserted and latches said second SCR in said conductive state after said second half-cycle until said first background control signal is asserted.

32. The welder of claim 31, wherein said logic circuit is operable to selectively refrain from providing said first SCR gating signal and said first background control signal or to selectively refrain from providing said second SCR gating signal and said second background control signal according to said disable signal.

33. The welder of claim 32, wherein said comparator circuit is operable to assert said disable signal in said AC mode if said setpoint current value is less than a first given value.

34. The welder of claim 31:
wherein said comparator circuit is operable to compare said setpoint current value with a first given current value; and
wherein said logic circuit is operable to selectively refrain from providing one of said first and second SCR gating signals in said AC mode if said setpoint current value is less than said first given value, and to selectively refrain from providing one of said first and second background control signals in said AC mode if said setpoint current value is less than said first given value.

35. The welder of claim 31:
wherein said comparator circuit is operable to compare said setpoint current value with a first given current value; and
wherein said logic circuit is operable to selectively refrain from providing said first SCR gating signal and said first background control signal if said setpoint current value is less than said first given value in said AC mode.

36. The welder of claim 31:
wherein said comparator circuit is operable to compare said setpoint current value with a first given current value; and
wherein said logic circuit is operable to selectively refrain from providing said second SCR gating signal and said second background control signal if said setpoint current value is less than said first given value in said AC mode.

37. The welder of claim 34, wherein said logic circuit comprises a flip-flop operable to selectively assert said first background control signal during said portion of said first half-cycle according to said first SCR control signal and thereafter until said second SCR control signal is active, and to assert said second background control signal during said portion of said second half-cycle according to said second SCR control signal and thereafter until said first SCR control signal is active.

38. The welder of claim 37, wherein said flip-flop is an RS flip-flop comprising:
a set input controlled according to said first SCR control signal,
a reset input controlled according to said second SCR control signal,
a first output operable to selectively assert said first background control signal if said flip-flop is set, and
a second output operable to selectively assert said second background control signal if said flip-flop is reset.

39. A TIG welder for providing a welding current to a welding circuit, said welder comprising:
a main supply comprising:
a transformer secondary winding, and
an SCR network including first and second SCRs connected between said transformer secondary winding and said welding circuit;
a control circuit connected to said first and second SCRs and operable to provide a gating signal to one of said first and second SCRs in said SCR network to connect said transformer secondary winding to said welding circuit so as to provide main supply current to said welding circuit during a portion of a power half-cycle; and
a background supply connected to said control circuit, said background supply comprising first and second DC power supplies connected to said first and second SCRs, respectively, wherein said background supply is operable to provide background current to said welding circuit through said one of said first and second SCRs in said SCR network during said portion of said power half-cycle and to latch said one of said first and second SCRs in a conductive state thereafter so as to provide background current to said welding circuit after said power half-cycle until said control circuit provides a gating signal to another of said first and second SCRs in said SCR network.

\* \* \* \* \*